United States Patent [19]

Nawa et al.

[11] Patent Number: 5,389,590
[45] Date of Patent: Feb. 14, 1995

[54] METHOD OF FABRICATING A SINTERED CERAMIC COMPOSITE

[75] Inventors: Masahiro Nawa, Katano; Koichi Niihara, 1142, Kori-Godo-chosha, 9-7, Korigaoka, Hirakata-shi, Osaka; Atsushi Nakahira, Suita; Tohru Sekino, Mino, all of Japan

[73] Assignees: Matsushita Electric Works, Ltd.; Koichi Niihara, both of Osaka, Japan

[21] Appl. No.: 192,727

[22] Filed: Feb. 7, 1994

Related U.S. Application Data

[62] Division of Ser. No. 769,398, Oct. 1, 1991, Pat. No. 5,296,301.

[30] Foreign Application Priority Data

| Oct. 8, 1990 | [JP] | Japan | 02-270916 |
| May 20, 1991 | [JP] | Japan | 03-145467 |
| May 21, 1991 | [JP] | Japan | 03-116358 |
| May 21, 1991 | [JP] | Japan | 03-116359 |

[51] Int. Cl.⁶ .................................................. C04B 35/65
[52] U.S. Cl. ........................................ 501/127; 501/97; 501/103; 501/108; 501/128
[58] Field of Search ............... 501/97, 98, 103, 108, 501/117, 127, 128

[56] References Cited

U.S. PATENT DOCUMENTS

| 4,283,441 | 8/1981 | Hoecker et al. | 427/126.3 |
| 4,325,710 | 4/1982 | Tanaka et al. | 501/127 X |
| 4,518,398 | 5/1985 | Tanaka et al. | 501/127 X |
| 4,525,464 | 6/1985 | Claussen et al. | 501/152 |
| 4,716,019 | 12/1987 | Houck et al. | |
| 4,853,353 | 8/1989 | Whalen et al. | 501/103 |
| 4,889,834 | 12/1989 | Niihara et al. | |
| 4,891,343 | 1/1990 | Quadir | 501/103 |
| 5,275,981 | 1/1994 | Nishiyama et al. | 501/127 X |

FOREIGN PATENT DOCUMENTS

| 0376878 | 7/1990 | European Pat. Off. |
| 2852638 | 6/1980 | Germany . |
| 3601794 | 7/1987 | Germany . |
| 57-29503 | 2/1982 | Japan . |
| 63-319263 | 12/1988 | Japan . |
| 64-87552 | 3/1989 | Japan . |
| 0594068 | 11/1947 | United Kingdom . |
| 0710562 | 6/1954 | United Kingdom . |
| 0985174 | 3/1965 | United Kingdom . |
| 1129462 | 10/1968 | United Kingdom . |
| 2039876 | 8/1980 | United Kingdom . |
| 2176471 | 12/1986 | United Kingdom . |
| 8704425 | 7/1987 | WIPO . |
| 8801196 | 2/1988 | WIPO . |

OTHER PUBLICATIONS

German Journal: Keramische Rundschau, vol. 50 (1942), No. 17, pp. 1232 to 1234, no month.

*Primary Examiner*—Karl Group
*Attorney, Agent, or Firm*—Stevens, Davis, Miller & Mosher

[57] ABSTRACT

A sintered ceramic-metal composite product has a ceramic matrix of polycrystalline ceramic in which a metal phase is dispersed for adding improved toughness. The metal phase has a higher melting point than the sintering temperature of the ceramic matrix and comprises at least one metal selected from the groups IVa, Va and VIa of the periodic table. The metal phase is dispersed intragranular within the grains of the ceramic matrix to realize nano-order dispersion of the metal phase which is responsible for remarkably improved toughness as well as strength. The ceramic-metal composite product is successfully fabricated by several unique methods utilizing the mixture of the ceramic and metal or metal oxide, hydride or alkoxide.

14 Claims, 3 Drawing Sheets

0.5 μm

1 μm

METHOD OF FABRICATING A SINTERED CERAMIC COMPOSITE

This application is a division of application Ser. No. 07/769,398, filed Oct. 1, 1991, now U.S. Pat. No. 5,296,301.

BACKGROUND OF THE INVENTION

1. Field of the Invention

The present invention is directed to a sintered ceramic-metal composite product and a method of fabricating the same.

2. Description of the Prior Art

Sintered polycrystalline ceramic products, due to their excellent heat, wear and corrosion resistance, are currently expected to have a wide variety of applications for use as forming turbo-charger rotors of automobiles, various cutting tools and tool bits, mechanical seals, and even sporting and leisure goods. However, because of inherently strong covalent and ionic bond that permit no substantial dislocation or plastic deformation as opposed to metallic materials, the ceramics fail to alleviate stress concentration occurring at a leading end of a crack and are therefore easily fractured as a consequence of that the crack proceeds as started from a minute internal defect or a surface scratch. Thus, the ceramics exhibit poor toughness with attendant brittleness which excludes the application of the ceramics for making large parts or parts of complicated shapes and therefore restricts the application only to parts of limited dimensions and shapes.

In order to overcome the brittleness, attempts have been made to provide a ceramic matrix composite of improved toughness and strength in which minute particles or whiskers of one ceramic material are dispersed into a matrix of another ceramic material. Such ceramic matrix composite strengthening has advanced from the ceramic particle dispersion to whisker or fibre dispersion, and from a micro-order inter-granular dispersion to a nano-order intra-granular dispersion. Particularly, the ceramic matrix composite of the nano-order dispersion [hereinafter referred to simply as nano-order ceramic composite] is reported to show remarkable improvement in mechanical strength, particularly at high temperature, for example, as disclosed in Japanese patent non-examined early publication (KOKAI) No. 64-87552. The patent teaches to strengthen α-alumina matrix by dispersing minute SiC particles within the granules of the alumina matrix. Besides, it is also known that improved mechanical strength is achieved in other nano-order ceramics composites of $Al_2O_3/Si_3N_4$ where $Si_3N_4$ is an intra-granular phase in the matrix of $Al_2O_3$ and MgO/SiC where SiC is an intra-granular phase in MgO matrix. As for a non-oxide ceramic matrix, a like nano-order ceramic composite of $Si_3N_4/SiC$ is known to exhibit improved strength, as described in the publication "Powder and Powder Metallurgy Vol. 1.36 page 243, 1989". The publication teaches to react $[Si(CH_3)_2]_2NH$ in an atmosphere of ammonia and hydrogen through chemical vapor deposition (CVD) technique to obtain amorphous composite powder of Si—C—N which is subsequently processed to present the corresponding ceramic composite $Si_3N_4/SiC$ in which SiC particles are dispersed within the granules of the $Si_3N_4$ matrix.

With regard to the toughness, the ceramic matrix composite of the micro-order dispersion [hereinafter referred to simply as micro-order ceramic composite] can exhibit an improved fracture toughness of about 10 $MPam^{\frac{1}{2}}$ for a ceramic matrix in which $ZrO_2$ particles or whiskers are dispersed and an even more improved fracture toughness of about 20 to 30 $MPam^{1/8}$ for a ceramic matrix in which long fibers of SiC are dispersed. While, on the other hand, the nano-order ceramic composite is found to exhibit the fracture toughness which is only about 30 to 40% of that for the micro-order ceramic composite. Despite the poor fracture toughness, the nano-order ceramic composite has an improved mechanical strength of as much as 160 to 200% of that of the micro-order ceramic composite. Consequently, it is most desirous to further improve fracture toughness of the nano-order ceramic composite so that the nano-order ceramic composite can combine excellent toughness and fracture strength.

SUMMARY OF THE INVENTION

The present invention has been achieved in view of the above, and has a primary object of presenting a sintered ceramic-metal composite product which combines excellent mechanical strength as well as fracture toughness sufficient for use as a structural material. The sintered ceramic-metal composite product in accordance with the present invention comprises a ceramic matrix of polycrystalline ceramic and a metal phase or constituent having a melting temperature higher than a sintering temperature of the ceramic matrix. The metal phase is dispersed within the grains of the ceramic matrix to effect nano-order intra-granular dispersion. Such dispersed metal phase, or metal constituent acts to inhibit crack propagation in the grains of the ceramic matrix to thereby attain greatly improved toughness while retaining excellent mechanical strength.

Another object of the present invention is to provide several methods of successfully fabricating the ceramic-metal composite product in-which the metal phase is dispersed intra-granular within the grains of the ceramic matrix. Included in the methods are:

1) to prepare a powder mixture containing a ceramic powder having an average particle size of 0.5 μm or less, and 5 to 50% by volume of at least one metal element selected from groups IVa, Va, and VIa of the periodic table, and sinter the powder mixture.

2) to prepare a powder mixture containing a ceramic powder having an average particle size of 0.5 μm or less, and a metal or metal oxide of at least one metal element selected from groups IVa, Va, and VIa of the periodic table, and sinter the powder mixture firstly in an atmospheric environment followed by sintering in a reducing environment.

3) to prepare a powder mixture of a ceramic powder having an average particle size of 0.5 μm or less, and a metal oxide or hydride of at least one metal element selected from groups IVa, Va and VIa of the periodic table, and sinter the powder mixture in a reducing environment.

4) to prepare a mixture of a ceramic powder having an average particle size of 0.5 μm or less, a metal alkoxide of at least one metal element selected from groups IVa, Va and VIa of the periodic table, and an alcohol; hydrolyze and heat the mixture into a resulting powder mixture, and subsequently Sinter the powder mixture in a reducing environment.

5) to dissolve a metal alkoxide of at least one metal element selected from groups IVa, Va and VIa of the periodic table together with an alkoxide of a ceramic constituting element into an alcohol to obtain an alcohol solution thereof, hydrolyze and heat the alcohol solution into a resulting powder mixture, and sinter the power mixture in a reducing environment.

6) to dissolve a metal alkoxide of at least one metal element selected from groups IVa, Va and VIa of the periodic table together with an alkoxide of a ceramic constituting element into an alcohol to provide an alcohol solution thereof, heat the solution to provide a composite alkoxide followed by hydrolyzing and heating the resulting composite alkoxide into a corresponding powder mixture, and subsequently sinter the powder mixture in a reducing environment.

With the above methods, the metal phase can be readily and successfully incorporated in the ceramic matrix during the sintering so as to precipitate as finely dispersed metal particles within the grains of the ceramic matrix, effecting nano-order dispersion of the metal particles responsible for remarkably improved toughness while retaining the excellent strength inherent to the ceramics, which is therefore a further object of the present invention.

These and still other objects and advantageous features of the present invention will become more apparent from the following description and examples of the present invention when taken in conjunction with the attached drawings.

DESCRIPTION OF THE INVENTION

Figure 1:
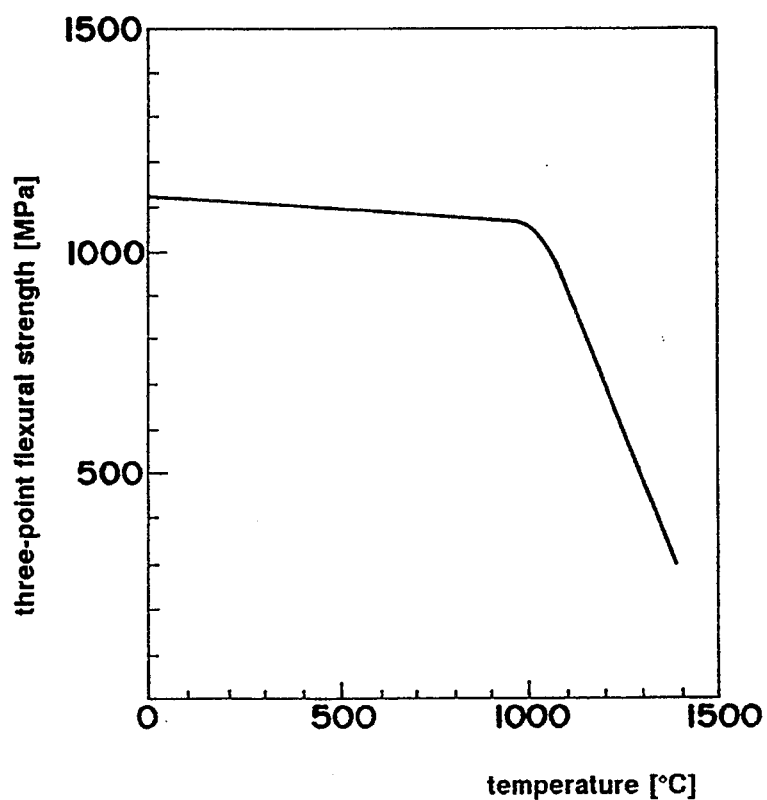
FIG. 1 is a graph illustrating three-point flexural strength (MPa) over a temperature range from a room temperature up to 1400° C. for a ceramic-metal composite product obtained in Example 1 of the present invention.

The present invention will be described hereinafter in more detail. The ceramic matrix utilized in the present invention may be oxides or non-oxides of a suitable metal, for example, $Al_2O_3$, MgO, partially stabilized zirconia, mullite, cordierite, $Si_3N_4$, SiC, and AlN, which can be sintered either at an atmospheric or increased pressure into a closely packed structure. In order to successfully migrate majority of the metal element into the grains of the ceramic matrix during the sintering process, the ceramic should be in the form of a powder having an average particle size of 0.5 μm or less and be of such kind as to effect grain growth during the sintering.

When the partially stabilized zirconia is selected as the ceramic matrix, the zirconia is preferred to incorporate $CeO_2$ as a stabilizing agent, and particularly in 5 to 30 mol %. Within this incorporation range, the partially stabilized zirconia can have a structure substantially made of tetragonal system or a mixed phase of tetragonal and cubic systems, which are responsible for imparting improved mechanical strength to the partially stabilized zirconia matrix. When $CeO_2$ is incorporated in less than 0.5 mol %, there occurs insufficient formation of tetragonal system of a metastable phase. Above 30 mol % of $CeO_2$, the cubic system predominates to lower the strength of the zirconia matrix.

The metal phase is limited to have a melting temperature higher than the sintering temperature of the ceramic matrix and is also limited to be made into a such a fine particle that can be incorporated within the grains of the ceramic matrix during the sintering. When the metal powder is utilized, its average particle size is preferred to be 1 μm. The metal phase may partially remain in the grain boundaries, but is preferred to be all dispersed within the grains of the ceramic matrix. In this regard, the metal phase is preferably contained in 0.5 to 50 vol %, and more preferably 2.5 to 30 vol %, based upon the ceramic-metal composite product. Below 0.5 vol % of the metal phase, no substantial improvement is expected as to the toughness. As the metal phase increases above 30 vol %, the metal phase has an increased chance of contacting to each other to thereby bring about correspondingly large grain growth of the metal phase during the sintering to such an extent as not to successfully migrate the metal particles into the grains of the ceramic matrix, whereby exhibiting gradual lowering of the toughness with the increase of the metal phase. When exceeding 50 mol %, the metal phase is inhibited from migrating into the grains of the ceramic matrix during the sintering to be thereby left in the grain boundaries of the ceramic matrix, resulting in a critical strength drop.

The metal element constituting the metal phase is selected in consideration of the sintering compatibility with the ceramic matrix, and includes Ti, Zr, Hf from group IVa, V, Nb, Ta from group Va, and Cr, Mo, W from group VIa of the periodic table. One or more of such metal element can be selected as constituting the metal phase. The metal phase may be obtained from a starting material of either metal element itself, metal oxide, metal hydride, or metal alkoxide.

Considering the sintering compatibility between the ceramic matrix and the metal phase in terms of coefficient of expansion, it is preferred to disperse the metal phase having coefficient of expansion less than that of the ceramic matrix since it will contribute to effectively improving the toughness of the ceramic matrix, although the present invention is not limited thereto. When the ceramic matrix is formed form the metal oxide including $Al_2O_3$, MgO, and partially stabilized zirconia but excluding mullite and cordierite, the above listed metal elements are all found satisfactory as they have individual melting points greater than the sintering temperature of the ceramic matrix as well as individual coefficients of expansion less than that of the ceramic matrix. When, on the other hand, oxide ceramics of mullite and cordierite as well as non-oxide ceramics of $Si_3N_4$, SiC, and AlN are known to have coefficients of expansion nearly equal to that of the above listed metal elements and are found nevertheless to be improved in toughness by the incorporation of the metal element or elements.

Now, discussion will be made as to a mechanism of improving the toughness and high temperature strength of the ceramic-metal composite product of the present invention. The metal phase or metal particles, which are dispersed within the grains of the ceramic matrix and partially in the grain boundaries thereof, will act to inhibit abnormal grain growth of the ceramic matrix during the sintering and therefore provide a fine structure, thereby minimizing origins of fracture and therefore improve the strength remarkably, in addition to that the dispersed metal particles, due to the inherent plastic deformability, improve the toughness. Such improved toughness is attributed to the behavior of the dispersed metal particles which will blunt or pin the leading edge of a crack being propagated so as to relieve stress concentration at the leading edge of the crack.

In a ceramic-metal composite product incorporating the metal phase having coefficient of expansion less than that of the ceramic matrix, the metal phase acts to improve the toughness more effectively. Discrepancy in expansion coefficient between the metal phase and the ceramic matrix will leave residual stress fields in the ceramic matrix and around the metal phase during cooling of the ceramic-metal composite product subsequent to the sintering, which residual stress fields act on the propagation path of the cracks to block further crack propagation. That is, during the cooling process the metal phase of less expansion coefficient will cause therearound tensile stress and therefore the residual stress fields by the presence of which the cracks are caused to propagate in such a manner as to be attracted to the metal phase, thereby inducing transgranular fracture. Thus, the crack will have an increased chance of colliding against the metal phase having plastic deformability to be thereby effectively blocked from further propagating. Considering the improvement in toughness in terms of effective fracture energy, the blocking of the crack propagation is expected to yield an increased surface energy of about 0.5 to 6 $J/m^2$, while the plastic deformation of metal phase is expected to absorb the energy as much as about 2000 to 3000 $J/m^2$. Thus, the metal phase of plastic deformability can give rise to a stress relief mechanism at the leading end of the crack to thereby remarkably improve the toughness to such an extent that has not been expected. In addition, during the cooling of the ceramic-metal composite product subsequent to the sintering, the metal phase dispersed in the ceramic matrix will cause in its axial directions residual compression stress fields which strengthen the grains of the ceramic matrix itself to fuhrer improve the strength of the composite product. It is noted at this time that the remarkably improved toughness is also attributed to the fact that the leading end of the crack is caused to bow or deflect between the adjacent metal particles of the metal phase as the crack propagates.

As to the high temperature strength, the metal phase dispersed within the grains of the ceramic matrix provides the following effects which are available even at high temperatures to give an improved high temperature strength to the ceramic-metal composite product. One effect is that the metal phase will inhibit matrix dislocation and therefore restrain plastic deformation at high temperatures, thereby improving creep strength. Another effect is that the residual compression stress produced in the axial directions of the metal phase will act to restrain grain boundary sliding or cavity formation which would otherwise lower the high temperature strength. The other effect is that the residual tensile stress produced around the metal phase will act to induce the transgranular fracture even at the high temperature. By reason of the above, the ceramic-metal composite product is expected to exhibit no critical lowering in strength even at an elevated temperature of 1000° C.

In the first method 1) of fabricating the ceramic-metal composite product from a powder mixture containing a ceramic powder and at least one metal element selected from groups IVa, Va, and VIa of the periodic table, the powder mixture is prepared as a blend of the ceramic power having an average particle size of 0.5 $\mu$m or less and a metal powder having an average particle size of 1 $\mu$m or less. Alternately, the powder mixture may be prepared by coating the ceramic powder of an average particle size of 0.5 $\mu$m or less with the metal and milling a resulting composite powder into a fine particle size, or may be prepared by coating granules of the aggregated ceramic powder of an average particle size of 0.5 $\mu$m or less with the metal and milling resulting coated granules into a fine particle size. The blend of the powder mixture is carried out, for example, by placing a suitable proportion of ceramic powder and the metal powder together with a suitable solvent such as ethanol, acetone, toluene into a wet ball-mill in order to mill the mixture followed by heating it to provide a fine composite powder. The powder mixture may be alternately intermixed and milled in an inert gas atmosphere such as argon or the like by means of a dry ball mill. The resulting blend or fine composite powder is pressed or molded by means of the conventional shape forming presses such as a dry press or injection molding into a compact of desired shape. Subsequently, the compact is sintered either at atmospheric pressure or vacuum condition with a gas-pressure press, hot-press, or hot hydraulic press [HIP] to obtain a sintered ceramic-metal composite product of fine structure. The sintering and compact forming may be made simultaneously. In order to avoid oxidization of the ceramic powder and the metal powder, the sintering is preferably made in a vacuum, inert gas atmosphere of nitrogen and argon, or in a reducing gas atmosphere of hydrogen. When sintering by the use of the hot hydraulic press, the compact may be preliminary heated at atmospheric pressure or with the use of the hot-press into a preliminary heated product with a reduced number of open pores, or the compact may be capsulized by means of airtight metal or glass seal prior to being sintered in the hydraulic press.

In the second method 2) of fabricating the ceramic-metal composite product from the powder mixture of the ceramic powder and the metal or oxide thereof, the powder mixture is preliminary heated in an atmospheric environment in order to produce composite oxides of the ceramic and the metal. The resulting composite oxides of the ceramic and the metal will allow the corresponding metal to precipitate as very fine particles in the ceramic matrix during the subsequent sintering in the reducing gas environment, thereby enabling to effect nano-order intragranular dispersion of the metal particles within the grains of the ceramic matrix. In thus obtained nano-order ceramic composite, the interface between the metal particles and the ceramic matrix is very activated to provide a strong interface bonding force responsible for excellent toughness as well as strength. The powder mixture of ceramic and metal and/or metal oxide is prepared as a blend of the ceramic powder and a metal and/or metal oxide powder in suitable proportions, and is placed together with a suitable solvent such as ethanol, acetone, toluene into a wet ball-mill to mill the mixture followed by heating it to provide a fine composite powder. The powder mixture may be alternately milled in a dry condition in the presence of an inert gas such as argon or the like by means of a dry ball mill.

The preliminary heating is carried out, preferably but not limited to, at a temperature of 500° to 1200° C. for 1 to 24 hours in the presence of oxygen in order to produce the composite oxides of the ceramic and the metal. Further, it is also preferable to again mil the preliminary heated product into a corresponding powder for use in the subsequent sintering. Such milling may be carried out by the use of a dry ball mill or alternately by placing the preliminary heated product together with the solvent such as ethanol, acetone or toluene into a wet ball mill and drying the resulting powder. The resulting powder is pressed or molded by means of the conventional shape forming presses such as a dry press or injection molding into a compact of desired shape. Subsequently, the compact is sintered either at atmospheric pressure or vacuum condition with a gas-pressure press, hot-press, or hot hydraulic press [HIP] to obtain a sintered ceramic-metal composite product of fine structure. The sintering and compact forming may be made simultaneously. The sintering should be carried out in the reduced gas atmosphere such as hydrogen until the metal oxide is reduced to the metal particles to be dispersed in the ceramic matrix. Once the reduction of the metal oxide is achieved, the subsequent sintering is carried out preferably in a vacuum, inert gas atmosphere of nitrogen and argon, or in a reducing gas atmosphere of hydrogen in order to avoid oxidization of the ceramic powder and the metal powder. When sintering with the hot hydraulic press, the compact may be preliminary heated at atmospheric pressure or with the use of the hot-press into a preliminary heated product with a reduced number of open pores, or the compact may be capsulized by means of airtight metal or glass seal prior to being sintered in the hydraulic press.

In the third method 3) of fabricating the ceramic-metal composite product from the powder mixture of the ceramic powder and the metal oxide or hydride, the powder mixture is sintered in a reducing environment such that the metal oxide or hydride will precipitate as very fine metal particles in the ceramic matrix, thereby activating energetically the interfaces between the metal particles and the ceramic matrix and therefore giving a very strong interface bonding force responsible for excellent toughness as well as strength. The powder mixture is prepared as a blend of the ceramic powder and a metal oxide or hydride in suitable proportions, and is placed together with a suitable solvent such as ethanol, acetone, toluene into a wet ball-mill to mill the mixture followed by heating it to provide a fine composite powder. Alternately, the powder mixture of the ceramic powder and metal oxide or hydride may be pulverized mechanochemically in a dry condition by the use of a ball mill, planetary ball mill, or high energy ball mill [known as the "Attoritor" available from Union Process Corp.] into a very fine powder mixture in which the metal oxide or hydride is pulverized into substantially amorphous state. With such fine powder mixture, it is possible to precipitate an extremely fine metal particles in the ceramic matrix during the sintering in the reducing environment to thereby effect nano-order intragranular dispersion of the metal particles in the grains of the ceramic matrix.

The powder mixture is pressed or molded by means of the conventional shape forming presses such as a dry press or injection molding into a compact of desired shape. Subsequently, the compact is sintered either at atmospheric pressure or vacuum condition with a gas-pressure press, hot-press, or hot hydraulic press [HIP] to obtain a sintered ceramic-metal composite product of fine structure. The sintering and compact forming may be made simultaneously. The sintering should be carried out in the reduced gas atmosphere such as hydrogen until the metal oxide or hydride is reduced to the metal particles dispersed in the ceramic matrix. Once the reduction of the metal oxide or hydride is achieved, the subsequent sintering is carried out preferably in a vacuum, inert gas atmosphere of nitrogen and argon, or in a reducing gas atmosphere of hydrogen in order to avoid oxidization of the ceramic powder and the metal powder. When sintering with the hot hydraulic press, the compact may be preliminary heated at atmospheric pressure or with the use of the hot-press into a preliminary heated product with a reduced number of open pores, or the compact may be capsulized by means of airtight metal or glass seal prior to being sintered in the hydraulic press.

In the fourth method 4) of fabricating the ceramic-metal composite product from the mixture of the ceramic powder, metal alkoxide, and alcohol, the mixture is firstly hydrolyzed to provide fine particles of the corresponding metal oxide dispersed in the alcohol and is then heated to obtain the fine metal oxide. During the subsequent sintering in a reducing environment, such fine metal oxide can be reduced to the corresponding metal such that the metal can precipice as very fine metal particles in the ceramic matrix, thereby effecting nano-order intragranular dispersion of the metal particles in the grains of the ceramic matrix. Such nano-order dispersion will activate energetically the interfaces between the metal particles and the ceramic matrix and therefore giving to the ceramic-metal composite product a very strong interface bonding force responsible for excellent toughness as well as strength.

The heating of the ceramic and metal oxide mixture after the hydrolysis is carried out, for example, preferably but not limited to, at a temperature of 800° C. for several hours. The resulting powder mixture is pressed or molded by means of the conventional shape forming presses such as a dry press or injection molding into a compact of desired shape. Subsequently, the compact is sintered either at atmospheric pressure or vacuum condition with a gas-pressure press, hot-press, or hot hydraulic press [HIP] to obtain a sintered ceramic-metal composite product of fine structure. The sintering and compact forming may be made simultaneously. The sintering should be carried out in the reduced gas atmosphere such as hydrogen until the metal oxide is reduced to the metal particles dispersed in the ceramic matrix. Once the reduction of the metal oxide is achieved, the subsequent sintering is carried out preferably in a vacuum, inert gas atmosphere of nitrogen and argon, or in a reducing gas atmosphere of hydrogen in order to avoid oxidization of the ceramic powder and the metal powder. When sintering with the hot hydraulic press, the compact may be preliminary heated at atmospheric pressure or with the use of the hot-press into a preliminary heated product with a reduced number of open pores, or the compact may be capsulized by means of airtight metal or glass seal prior to being sintered in the hydraulic press.

In the fifth method 5) of fabricating the ceramic-metal composite product from the mixture of a metal alkoxide and the alkoxide of a ceramic constituting element in an alcohol, the mixture or alcohol solution is firstly hydrolyzed to provide fine particles of the ceramic and metal oxide dispersed in the alcohol and is then heated to obtain the fine particles. During the subsequent sintering in a reducing environment, the fine metal oxide can be reduced to the corresponding metal such that the metal can precipice as very fine metal particles in the ceramic matrix, thereby effecting nano-order intragranular dispersion of the metal particles in the grains of the ceramic matrix. Such nano-order dispersion will activate energetically the interfaces between the metal particles and the ceramic matrix and therefore giving to the ceramic-metal composite product a very strong interface bonding force responsible for excellent toughness as well as strength. This method is basically identical to the above fourth method 4) except that the alkoxide of a ceramic constituting element is utilized instead of the ceramic powder. Therefore, the compact forming and the sintering can be made in the identical manner as in the fourth 4) method.

In the fifth method 6) of fabricating the ceramic-metal composite product from the mixture of a metal alkoxide and the alkoxide of a ceramic constituting element in an alcohol, the mixture or alcohol solution is firstly heated to provide a composite alkoxide which is subsequently hydrolyzed to give rise to a correspondingly composite oxide particle of the ceramic and the metal dispersed in the alcohol and is then heated to obtain the fine composite oxide particles. During the subsequent sintering in a reducing environment, the fine composite oxide particles are converted into the corresponding ceramic matrix and the metal phase which is caused to precipitate as very fine metal particles in the resulting ceramic matrix, thereby effecting nano-order intragranular dispersion of the metal particles in the grains of the ceramic matrix. Such nano-order dispersion will activate energetically the interfaces between the metal particles and the ceramic matrix and therefore giving to the ceramic-metal composite product a very strong interface bonding force responsible for excellent toughness as well as strength.

The heating for providing the composite alkoxide is carried out, preferably but not limited thereto, at a temperature of 100° C. for several hours. This method is basically identical to the above fourth method 5) except that the composite alkoxide is additionally provided by heating prior to the hydrolysis. Therefore, the compact forming and the sintering can be made in the identical manner as in the fourth 5) method.

The following examples and comparative examples show the comparative results with the metal particles dispersed in varying proportions in the ceramic matrix, but it is to be understood that these examples are given by way of illustration and not of limitation.

Examples 1 to 6 and Comparative Examples 1 to 2

A 99.9% or more pure alumina powder [$\alpha$-$Al_2O_3$] having an average particle size of 0.2 $\mu$m was blended with a 99.9% or more pure tungsten [W] powder having an average particle size of 0.35 $\mu$m in added proportions of 0 to 60% by volume based upon the total volume, as listed in Table 1, to prepare a powder mixture or pure alumina powder. The resulting powder mixture or pure powder was placed in a wet ball mill, composed of polyethylene-made vessel and polyethylene-coated iron balls, together with a solvent of acetone and was milled for 24 hours. The resulting fine powder was then molded in a graphite-made mold and sintered-in a hydrogen reducing environment up to a temperature of 1000° C. followed by being sintered in a vacuum of $10^{-4}$ Torr or more at a temperature of 1400° C. for 1 hour as being compressed at a pressure of 30 MPa to obtain a disk-shaped sintered product of 50 mm diameter and 4 mm thick.

The sintered product of Examples 1 to 6 containing added volume of 50% or less of W were all found to have fine structure with relative density of 99% or more and with porosity of 1% or less, and were also observed by scan-type electron photomicrograph and transmission-type electron photomicrograph that W particles are certainly present within the grains of $\alpha$-$Al_2O_3$. By chemical and X-ray diffraction quantitative analysis it was confirmed that the individual sintered products had the same component proportions as the initial blend proportions as listed in Table 1, that the ratio of W present at the grain boundaries increased with the increased amount of W added, and that substantially all of W particles were seen at the grain boundaries for the sintered product of comparative Example 2 containing 60% by volume of W.

Then, the disk-shaped sintered product were-all cut and grounded into corresponding test specimens each measuring 4×3×35 mm. The test specimens were tested with respect to three-point flexural strength at room temperature in accordance with Japanese Industrial Standard (JIS) R-1601. In addition, the test specimens were mirror-polished to be tested with respect to Vickers hardness-and to fracture toughness at room temperature in accordance with JIS R-1607, SEPB (single edge precracked beam) method. The test results are listed in Table 1. The three-point flexural strength is defined to be a strength at which the specimen supported at two spaced supporting points breaks with such strength applied midway between the supporting points. The fracture toughness was measured for the specimen in which a crack had been made midway thereof prior to being subjected to the test.

TABLE I

|  | Incorporated amount of W [vol %] | Proportion of W particles in the matrix grain [%] | Three-point flexural strength [MPa] | Fracture toughness [MPam$^{\frac{1}{2}}$] | Vickers Hardness [GPa] |
| --- | --- | --- | --- | --- | --- |
| Example 1 | 5 | 85 | 1125 | 7.2 | 18.5 |
| Example 2 | 10 | 83 | 1235 | 7.7 | 18.3 |
| Example 3 | 20 | 80 | 1315 | 8.2 | 18.0 |
| Example 4 | 30 | 70 | 1310 | 8.4 | 17.6 |
| Example 5 | 40 | 52 | 1050 | 8.6 | 17.3 |
| Example 6 | 50 | 25 | 705 | 9.0 | 16.9 |

TABLE I-continued

|  | Incorporated amount of W [vol %] | Proportion of W particles in the matrix grain [%] | Three-point flexural strength [MPa] | Fracture toughness [MPam$^{\frac{1}{2}}$] | Vickers Hardness [GPa] |
| --- | --- | --- | --- | --- | --- |
| Comparative Example 1 | 0 | — | 500 | 3.0 | 18.8 |
| Comparative Example 2 | 60 | 0 | 410 | 9.3 | 16.5 |

TABLE 2

|  | Incorporated amount of W [vol %] | Average particle size of W particles [μm] | Three-point flexural strength [MPa] | Fracture toughness [MPam$^{\frac{1}{2}}$] | Vickers Hardness [GPa] |
| --- | --- | --- | --- | --- | --- |
| Example 1 | 5 | 0.35 | 1125 | 7.2 | 18.5 |
| Comparative Example 3 | 5 | 3 | 525 | 8.3 | 18.0 |

The specimens of Example 1 were also tested with regard to the three-point flexural strength [MPa] over a temperature range of from room temperature to 1400° C. to examine the temperature-dependent strength [MPa], which is illustrated in FIG. 1. As apparent from FIG. 1, the product of Example 1 maintains the flexural strength at the room temperature up to about 1000 ® C., opposed to that pure alumina will exhibit critical drop in the flexural strength at about 800° C. due to slow crack growth (SCG).

Figure 2:
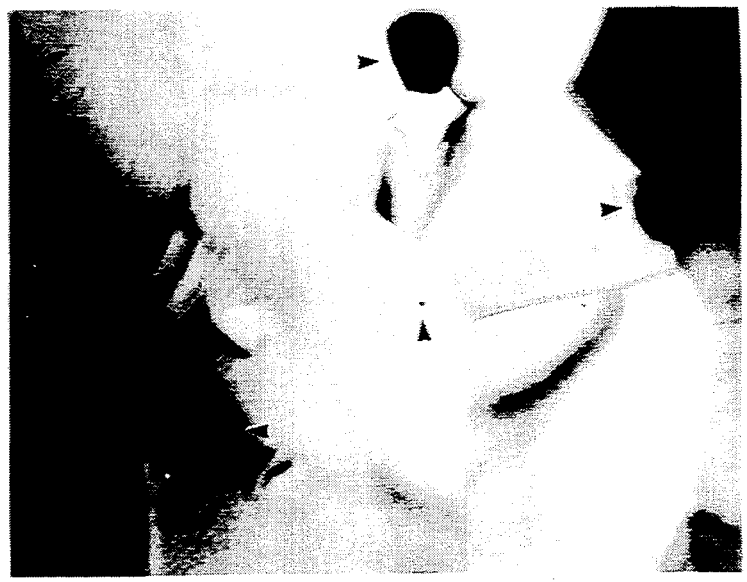
FIG. 2 is a transmission-type electron photomicrograph showing the grain structure of the composite product of Example 1.

FIG. 2 is a transmission-type electron photomicrograph illustrating a grain structure of the sintered product of Example 1 in which black dots represent W particles. From the figure, it is confirmed that W particles are dispersed within the grains of $\alpha$-Al$_2$O$_3$ and that no reactive phase appears at the interface between Al$_2$O$_3$ and W particles.

Figure 3:
FIG. 3 is a scan-type electron photomicrograph showing the grain structure at the fractured face of the composite product of Example 1.

FIG. 3 is a scan-type electron photomicrograph illustrating the grain structure in fractured face of the sintered product of Example 1 after subjected to the three-point flexural strength test in which white dots represent W particles. From this figure, it is confirmed that W particles are present within the grains of the $\alpha$-Al$_2$O$_3$ and that the fractured face is rather flat which demonstrates the occurrence of transgranular fracture.

Comparative Example 3

A 99.9% or more pure alumina powder [$\alpha$-Al$_2$O$_3$] having an average particle size of 0.2 μm was blended with 5% by volume, based upon the total volume, of 99.9% or more pure tungsten [W] powder having an average particle size of 3 μm to prepare a powder mixture. The powder mixture was processed in the identical manner as in Example 1 to obtain a disk-shaped sintered product of 50 mm diameter and 4 mm thick, which was found to be of fine structure having relative density of 99% or more and porosity of 1% or less, but was observed to have substantially all the W particles are present in the grain boundaries of $\alpha$-Al$_2$O$_3$ from a scan-type electron photomicrograph. Then, the disk-shaped sintered product were cut and grounded into corresponding test specimens measuring 4×3×35 mm and were subjected to the same tests as in Example 1 to obtain the three-point flexural strength at room temperature, Vickers hardness, and fracture toughness at room temperature. The test results are listed in Table 2 together with those of Example 1 for comparison.

Figure 4:
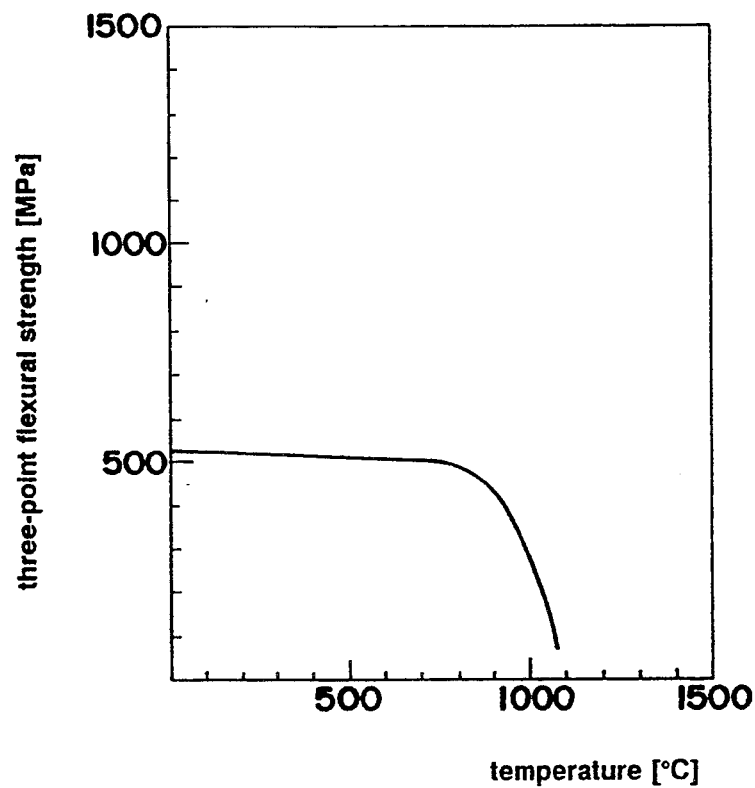
FIG. 4 is a graph illustrating three-point flexural strength (MPa) over a temperature range from a room temperature up to 1400° C. for a ceramic-metal composite product obtained in comparative Example 3.

The specimens of comparative Example 3 were also tested with regard to the three-point flexural strength [MPa] over a temperature range of from room temperature to 1400° C. to examine the temperature-dependent strength [MPa], which is illustrated in FIG. 4. As apparent from FIG. 4, comparative Example 3 shows an abrupt drop in the flexural strength before reaching 1000° C. Also from Table 2, it is known that comparative Example 3 utilizing the W particles of average particle size of 3 μm show a less three-point flexural strength than Example 1.

Examples 7 to 12 and Comparative Examples 4 and 5

A 99.9% or more pure alumina powder [$\alpha$-Al$_2$O$_3$] having an average particle size of 0.2 μm was blended with a 99.9% or more pure molybdenum [Mo] powder having an average particle size of 0.65 μm in added proportions of 0 to 60% by volume based upon the total volume, as listed in Table 1, to prepare a powder mixture. The resulting power mixture was placed in a wet ball mill, composed of polyethylene-made vessel and polyethylene-coated iron balls, together with a solvent of acetone and was milled for 24 hours. The resulting fine powder was then molded in a graphite-made mold and sintered in a hydrogen reducing environment up to a temperature of 1000° C. followed by being sintered in a vacuum of 10$^{-4}$ Torr or more at a temperature of 1500° C. for 1 hour as being compressed at a pressure of 30 MPa to obtain a disk-shaped sintered product of 50 mm diameter and 4 mm thick.

The sintered product of Examples 7 to 12 containing added volume of 50% or less of Mo were all found to have fine structure with relative density of 99% or more and with porosity of 1% or less, and were also observed by scan-type electron photomicrograph and transmission-type electron photomicrograph that Mo particles are certainly present within the grains of $\alpha$-Al$_2$O$_3$. By chemical and X-ray diffraction quantitative analysis it was confirmed that the individual sintered products had the same component proportions as the initial blend proportions as listed in Table 3, that the ratio of Mo present at the grain boundaries increased with the increased amount of Mo added, and that substantially all of Mo particles were seen at the grain boundaries for the sintered product of comparative Example 5 containing 60% by volume of Mo.

Then, the disk-shaped sintered product were all cut and grounded into corresponding test specimens each measuring 4×3×35 mm, and were subjected to the same tests as in Example 1 to obtain the three-point flexural strength at room temperature, Vickers hardness, and fracture toughness at room temperature. The test results are listed in Table 3.

TABLE 3

|  | Incorporated amount of Mo [vol %] | Proportion of Mo particles in the matrix grain [%] | Three-point flexural strength [MPa] | Fracture toughness [MPam$^{\frac{1}{2}}$] | Vickers Hardness [GPa] |
| --- | --- | --- | --- | --- | --- |
| Example 7 | 5 | 70 | 1220 | 7.8 | 18.0 |
| Example 8 | 10 | 68 | 1315 | 8.3 | 17.8 |
| Example 9 | 20 | 65 | 1430 | 6.8 | 17.5 |
| Example 10 | 30 | 60 | 1425 | 9.0 | 17.1 |
| Example 11 | 40 | 46 | 1150 | 9.2 | 16.8 |
| Example 12 | 50 | 25 | 710 | 9.6 | 16.4 |
| Comparative Example 4 | 0 | — | 500 | 3.0 | 18.8 |
| Comparative Example 5 | 60 | 0 | 415 | 9.9 | 16.0 |

TABLE 4

|  | Incorporated amount of Mo [vol %] | Average particle size of Mo Particles [μm] | Three-point flexural strength [MPa] | Fracture toughness [MPam$^{\frac{1}{2}}$] | Vickers Hardness [GPa] |
| --- | --- | --- | --- | --- | --- |
| Example 7 | 5 | 0.65 | 1220 | 7.8 | 18.0 |
| Comparative Example 6 | 5 | 3 | 570 | 8.7 | 17.7 |

Figure 5:
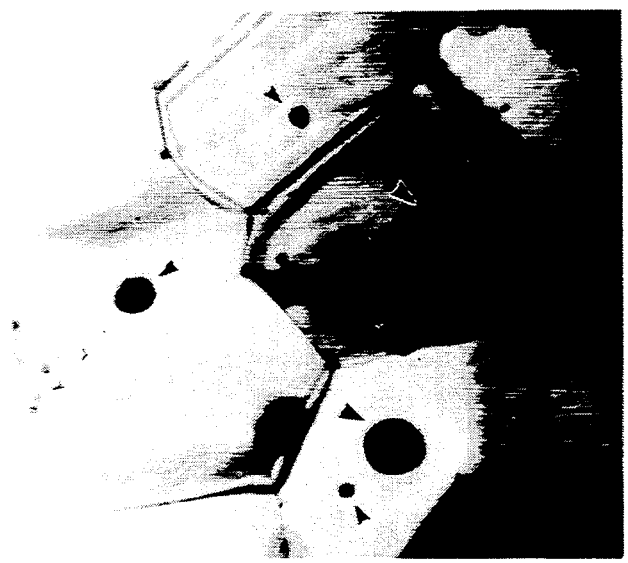
FIG. 5 is a transmission-type electron photomicrograph showing the grain structure of the composite product of Example 7.
Figure 6:
FIG. 6 is a scan-type electron photomicrograph showing the grain structure at the fractured face of the composite product of Example 7.

FIG. 5 is a transmission-type electron photomicrograph illustrating a grain structure of the sintered product of Example 7 in which black dots represent Mo particles. From the figure, it is confirmed that Mo particles are dispersed within the grains of α-Al$_2$O$_3$ and that no reactive phase appears at the interface between Al$_2$O$_3$ and Mo particles.

FIG. 3 is a scan-type electron photomicrograph illustrating the grain structure in fractured face of the sintered product of Example 7 after subjected to the three-point flexural strength test in which white dots represent Mo particles. From this figure, it is confirmed that Mo particles are present within the grains of the α-Al$_2$O$_3$ and that the fractured face is rather flat which demonstrates the occurrence of transgranular fracture.

Comparative Example 6

A 99.9% or more pure alumina powder [α-Al$_2$O$_3$] having an average particle size of 0.2 μm was blended with 5% by volume, based upon the total volume, of 99.9% or more pure molybdenum [Mo] powder having an average particle size of 3 μm to prepare a powder mixture. The powder mixture was processed in the identical manner as in Example 7 to obtain a disk-shaped sintered product of 50 mm diameter and 4 mm thick, which was found to be of fine structure having relative density of 99% or more and porosity of 1% or less, but was observed to have substantially all the Mo particles are present in the grain boundaries of α-Al$_2$O$_3$ by scan-type electron photomicrograph. Then, the disk-shaped sintered product were cut and grounded into corresponding test specimens measuring 4×3×35 mm and were subjected to the same tests as in Example 1 to obtain the three-point flexural strength at room temperature, Vickers hardness, and fracture toughness at room temperature. The test results are listed in Table 4 together with those of Example 7 for comparison. As apparent from Table 4, the sintered product of comparative Example 6 has three-point flexural strength less than that of Example 7.

Examples 13 to 18 and Comparative Examples 7 and 8

A 99.9% or more pure magnesium oxide powder [MgO] having an average particle size of 0.1 μm was blended with a 99.9% or more pure tungsten [W] powder having an average particle size of 0.35 μm in added proportions of 0 to 60% by volume based upon the total volume, as listed in Table 5, to prepare a powder mixture. The resulting power mixture was placed in a wet ball mill, composed of polyethylene-made vessel and polyethylene-coated iron balls, together with a solvent of acetone and was milled for 24 hours. The resulting fine powder was then molded in a graphite-made mold and sintered in a hydrogen reducing environment up to a temperature of 1000° C. followed by being sintered in an argon gas environment at a temperature of 1450° C. for 1 hour as being compressed at a pressure of 30 MPa to obtain a disk-shaped sintered product of 50 mm diameter and 4 mm thick.

The sintered product of Examples 13 to 18 containing added volume of 50% or less of W were all found to have fine structure with relative density of 99% or more and with porosity of 1% or less, and were also observed by scan-type electron photomicrograph and transmission-type electron photomicrograph that W particles are certainly present within the grains of MgO. By chemical and X-ray diffraction quantitative analysis it was confirmed that the individual sintered products had the same component proportions as the initial blend proportions as listed in Table 5, that the ratio of W present at the grain boundaries increased with the increased amount of W added, and that substantially all of W particles were seen at the grain boundaries for the sintered product of comparative Example 8 containing 60% by volume of W.

Then, the disk-shaped sintered product were all cut and grounded into corresponding test specimens each measuring 4×3×35 mm, and were subjected to the same tests as in Example 1 to obtain the three-point flexural strength at room temperature, Vickers hardness, and fracture toughness at room temperature. The test results are listed in Table 5.

TABLE 5

|  | Incorporated amount of W [vol %] | Proportion of W particles in the matrix grain [%] | Three-point flexural strength [MPa] | Fracture toughness [MPam$^{\frac{1}{2}}$] | Vickers Hardness [GPa] |
| --- | --- | --- | --- | --- | --- |
| Example 13 | 5 | 83 | 995 | 6.5 | 8.0 |

TABLE 5-continued

| | Incorporated amount of W [vol %] | Proportion of W particles in the matrix grain [%] | Three-point flexural strength [MPa] | Fracture toughness [MPam$^{\frac{1}{2}}$] | Vickers Hardness [GPa] |
|---|---|---|---|---|---|
| Example 14 | 10 | 81 | 1100 | 7.0 | 7.8 |
| Example 15 | 20 | 78 | 1215 | 7.5 | 7.5 |
| Example 16 | 30 | 68 | 1210 | 7.7 | 7.1 |
| Example 17 | 40 | 50 | 935 | 7.9 | 6.8 |
| Example 18 | 50 | 25 | 495 | 8.3 | 6.4 |
| Comparative Example 7 | 0 | — | 400 | 2.5 | 8.8 |
| Comparative Example 8 | 60 | 0 | 205 | 8.6 | 6.0 |

TABLE 6

| | Incorporated amount of W [vol %] | Average particle size of W particles [μm] | Three-point flexural strength [MPa] | Fracture toughness [MPam$^{\frac{1}{2}}$] | Vickers Hardness [GPa] |
|---|---|---|---|---|---|
| Example 13 | 5 | 0.35 | 995 | 6.5 | 8.0 |
| Comparative Example 9 | 5 | 3.5 | 460 | 7.8 | 7.5 |

Comparative Example 9

A 99.9% or more pure magnesium oxide [α-Al$_2$O$_3$] powder having an average particle size of 0.1 μm was blended with 5% by volume, based upon the total volume, of 99.9% or more pure tungsten [W] powder having an average particle size of 3.5 μm to prepare a powder mixture. The powder mixture was processed in the identical manner as in Example 13 to obtain a disk-shaped sintered product of 50 mm diameter and 4 mm thick, which was found to be of fine structure having relative density of 99% or more and porosity of 1% or less, but was observed to have substantially all the W particles are present in the grain boundaries of MgO by scan-type electron photomicrograph. Then, the disk-shaped sintered product were cut and grounded into corresponding test specimens measuring 4×3×35 mm and were subjected to the same tests as in Example 1 to obtain the three-point flexural strength at room temperature, Vickers hardness, and fracture toughness at room temperature. The test results are listed in Table 6 together with those of Example 13 for comparison. As apparent from Table 6, the sintered product of comparative Example 9 has three-point flexural strength less than that of Example 13.

Examples 19 to 24 and Comparative Examples 10 and 11

A 98% or more pure α-Si$_3$N$_4$ powder having an average particle size of 0.2 μm was blended with a 99.9% or more pure molybdenum [Mo] powder having an average particle size of 0.65 μm in added proportions of 0 to 60% by volume based upon the total volume, as listed in Table 7, together with 5% by weight of Al$_2$O$_3$ and 5% by weight of Y$_2$O$_3$ to prepare a powder mixture additionally including Al$_2$O$_3$ and Y$_2$O$_3$ as sintering promoting agents. The resulting power mixture was placed in a wet ball mill, composed of polyethylene-made vessel and polyethylene-coated iron balls, together with a solvent of acetone and was milled for 24 hours. The resulting fine powder was then molded in a graphite-made mold and sintered in a hydrogen reducing environment up to a temperature of 1000° C. followed by being sintered in an argon gas environment at a temperature of 1800° C. for 3 hours as being compressed at a pressure of 30 MPa to obtain a disk-shaped sintered product of 50 mm diameter and 4 mm thick.

The sintered product of Examples 19 to 24 containing added volume of 50% or less of Mo were all found to have fine structure with relative density of 99% or more and with porosity of 1% or less, and were also observed by scan-type electron photomicrograph and transmission-type electron photomicrograph that Mo particles are certainly present within the grains of β-Si$_3$N$_4$. By chemical and X-ray diffraction quantitative analysis it was confirmed that the individual sintered products had the same component proportions as the initial blend proportions as listed in Table 7, that the ratio of Mo present at the grain boundaries increased with the increased amount of Mo added, and that substantially all of Mo particles were seen at the grain boundaries for the sintered product of comparative Example 11 containing 60% by volume of Mo.

Then, the disk-shaped sintered product were all cut and grounded into corresponding test specimens each measuring 4×3×35 mm, and were subjected to the same tests as in Example 1 to obtain the three-point flexural strength at room temperature, Vickers hardness, and fracture toughness at room temperature. The test results are listed in Table 7.

TABLE 7

| | Incorporated amount of Mo [vol %] | Proportion of Mo particles in the matrix grain [%] | Three-point flexural strength [MPa] | Fracture toughness [MPam$^{\frac{1}{2}}$] | Vickers Hardness [GPa] |
|---|---|---|---|---|---|
| Example 19 | 5 | 72 | 1210 | 7.0 | 14.5 |
| Example 20 | 10 | 70 | 1320 | 7.5 | 14.3 |
| Example 21 | 20 | 67 | 1400 | 8.0 | 14.0 |
| Example 22 | 30 | 62 | 1395 | 8.2 | 13.6 |
| Example 23 | 40 | 48 | 1135 | 8.4 | 13.3 |
| Example 24 | 50 | 25 | 790 | 8.8 | 12.9 |
| Comparative Example 10 | 0 | — | 600 | 4.0 | 15.3 |
| Comparative Example 11 | 60 | 0 | 495 | 9.1 | 12.5 |

TABLE 8

|  | Incorporated amount of Mo [vol %] | Average particle size of Mo Particles [μm] | Three-point flexural strength [MPa] | Fracture toughness [MPam$^{\frac{1}{2}}$] | Vickers Hardness [GPa] |
| --- | --- | --- | --- | --- | --- |
| Example 19 | 5 | 0.65 | 1210 | 7.0 | 14.5 |
| Comparative Example 12 | 5 | 3.5 | 575 | 6.0 | 14.0 |

Comparative Example 12

A powder mixture was prepared in the identical manner as in Example 19 except that Mo powder having a larger average particle size of 3.5 μm was utilized instead of the Mo particles having the average particle size of 0.65 μm. The powder mixture was processed in the identical manner as in Example 19 to obtain a disk-shaped sintered product of 50 mm diameter and 4 mm thick, which was found to be of fine structure having relative density of 99% or more and porosity of 1% or less, but was observed to have substantially all the Mo particles are present in the grain boundaries of $\beta$-Si$_3$N$_4$ by scan-type electron photomicrograph. Then, the disk-shaped sintered product were cut and grounded into corresponding test specimens measuring 4×3×35 mm and were subjected to the same tests as in Example 1 to obtain the three-point flexural strength at room temperature, Vickers hardness, and fracture toughness at room temperature. The test results are listed in Table 8 together with those of Example 19 for comparison. As apparent from Table 8, the sintered product of comparative Example 12 has three-point flexural strength less than that of Example 19.

Examples 25 to 30 and Comparative Examples 13 and 14

A 99.9% or more pure mullite [3Al$_2$O$_3$.2SiO$_2$] powder having an average particle size of 0.2 μm was blended with a 99.9% or more pure tungsten [W] powder having an average particle size of 0.35 μm in added proportions of 0 to 60% by volume based upon the total volume, as listed in Table 9, to prepare a powder mixture. The resulting power mixture was placed in a wet ball mill, composed of polyethylene-made vessel and polyethylene-coated iron balls, together with a solvent of acetone and was milled for 24 hours. The resulting fine powder was then molded in a graphite-made mold and sintered in a hydrogen reducing environment up to a temperature of 1000° C. followed by being sintered in an argon gas environment at a temperature of 1600° C. for 1 hour as being compressed at a pressure of 30 MPa to obtain a disk-shaped sintered product of 50 mm diameter and 4 mm thick.

The sintered product of Examples 25 to 30 containing added volume of 50% or less of W were all found to have fine structure with relative density of 99% or more and with porosity of 1% or less, and were also observed by scan-type electron photomicrograph and transmission-type electron photomicrograph that W particles are certainly present within the grains of mullite. By chemical and X-ray diffraction quantitative analysis it was confirmed that the individual sintered products had the same component proportions as the initial blend proportions as listed in Table 9, that the ratio of W present at the grain boundaries increased with the increased amount of W added, and that substantially all of W particles were seen at the grain boundaries for the sintered product of comparative Example 14 containing 60% by volume of W.

Then, the disk-shaped sintered product were all cut and grounded into corresponding test specimens each measuring 4×3×35 mm, and were subjected to the same tests as in Example 1 to obtain the three-point flexural strength at room temperature, Vickers hardness, and fracture toughness at room temperature. The test results are listed in Table 9.

TABLE 9

|  | Incorporated amount of W [vol %] | Proportion of W particles in the matrix grain [%] | Three-point flexural strength [MPa] | Fracture toughness [MPam$^{\frac{1}{2}}$] | Vickers Hardness [GPa] |
| --- | --- | --- | --- | --- | --- |
| Example 25 | 5 | 85 | 750 | 4.7 | 11.5 |
| Example 26 | 10 | 83 | 825 | 5.1 | 11.2 |
| Example 27 | 20 | 79 | 905 | 5.5 | 10.8 |
| Example 28 | 30 | 72 | 900 | 5.7 | 10.2 |
| Example 29 | 40 | 50 | 705 | 5.9 | 9.7 |
| Example 30 | 50 | 25 | 370 | 6.3 | 9.2 |
| Comparative Example 13 | 0 | — | 300 | 1.8 | 11.6 |
| Comparative Example 14 | 60 | 0 | 155 | 6.6 | 8.7 |

TABLE 10

|  | Incorporated amount of W [vol %] | Average particle size of W particles [μm] | Three-point flexural strength [MPa] | Fracture toughness [MPam$^{\frac{1}{2}}$] | Vickers Hardness [GPa] |
| --- | --- | --- | --- | --- | --- |
| Example 25 | 5 | 0.35 | 750 | 4.7 | 11.5 |
| Comparative Example 15 | 5 | 3.5 | 345 | 5.6 | 10.7 |

Comparative Example 15

A powder mixture was prepared in the identical manner as in Example 25 except that W powder having a larger average particle size of 3.5 μm was utilized instead of the W particles having the average particle size of 0.35 μm. The powder mixture was processed in the identical manner as in Example 25 to obtain a disk-shaped sintered product of 50 mm diameter and 4 mm thick, which was found to be of fine structure having relative density of 99% or more and porosity of 1% or less, but was observed to have substantially all the W particles are present in the grain boundaries of mullite by scan-type electron photomicrograph. Then, the disk-shaped sintered product were cut and grounded into corresponding test specimens measuring 4×3×35 mm and were subjected to the same tests as in Example 1 to obtain the three-point flexural strength at room temperature, Vickers hardness, and fracture toughness at room temperature. The test results are listed in Table 10 together with those of Example 25 for comparison. As apparent from Table 10, the sintered product of comparative Example 15 has three-point flexural strength less than that of Example 25.

Examples 16 and 17 have a crystalline structure of cubic system. Then, the disk-shaped sintered product were all cut and grounded into corresponding test specimens each measuring 4×3×35 mm, and were subjected to the same tests as in Example 1 to obtain the three-point flexural strength at room temperature, Vickers hardness, and fracture toughness at room temperature. The test results are listed in Table 11.

TABLE 11

|  | Incorporated amount of W [vol %] | Proportion of W particles in the matrix grain [%] | Three-point flexural strength [MPa] | Fracture toughness [MPam$^{\frac{1}{2}}$] | Vickers Hardness [GPa] |
| --- | --- | --- | --- | --- | --- |
| Example 31 | 5 | 64 | 1390 | 12.6 | 10.9 |
| Example 32 | 10 | 82 | 1470 | 13.2 | 10.6 |
| Example 33 | 20 | 79 | 1590 | 13.5 | 10.2 |
| Example 34 | 30 | 70 | 1570 | 13.8 | 9.6 |
| Example 35 | 40 | 53 | 1310 | 14.0 | 9.1 |
| Example 36 | 50 | 25 | 990 | 14.3 | 8.6 |
| Comparative Example 16 | 0 | — | 700 | 8.0 | 11.0 |
| Comparative Example 17 | 60 | 0 | 605 | 14.5 | 8.1 |

TABLE 12

|  | Incorporated amount of W [vol %] | Average particle size of W particles [μm] | Three-point flexural strength [MPa] | Fracture toughness [MPam$^{\frac{1}{2}}$] | Vickers Hardness [GPa] |
| --- | --- | --- | --- | --- | --- |
| Example 31 | 5 | 0.35 | 1390 | 12.6 | 10.9 |
| Comparative Example 18 | 5 | 3.5 | 840 | 13.3 | 10.2 |

Examples 31 to 36 and Comparative Examples 16 and 17

A partially stabilized zirconia powder having an average particle size of 0.2 μm and containing 12 mol % of $CeO_2$ was blended with a 99.9% or more pure tungsten [W] powder having an average particle size of 0.35 μm in added proportions of 0 to 60% by volume based upon the total volume, as listed in Table 11, to prepare a powder mixture. The resulting power mixture was placed in a wet ball mill, composed of polyethylene-made vessel and polyethylene-coated iron balls, together with a solvent of acetone and was milled for 24 hours. The resulting fine powder was then molded in a high-pure alumina-made mold and sintered in an argon gas environment at a temperature of 1400° C. for 2 hours as being compressed at a pressure of 30 MPa to obtain a disk-shaped sintered product of 50 mm diameter and 4 mm thick.

The sintered product of Examples 31 to 36 containing added volume of 50% or less of W were all found to have fine structure with relative density of 99% or more and with porosity of 1% or less, and were also observed by scan-type electron photomicrograph and transmission-type electron photomicrograph that W particles are certainly present within the grains of partially stabilized zirconia. By chemical and X-ray diffraction quantitative analysis it was confirmed that the individual sintered products had the same component proportions as the initial blend proportions as listed in Table 11. Also it was confirmed that the ratio of minute W particles present at the grain boundaries increased with the increased amount of W added, and that substantially all of W particles were seen at the grain boundaries for the sintered product of comparative Example 17 containing 60% by volume of W. Further, it was seen that all the sintered products of Examples 31 to 36 and comparative Examples 16 and 17 have a crystalline structure of cubic system. Then, the disk-shaped sintered product were cut and grounded into corresponding test specimens measuring 4×3×35 mm and were subjected to the same tests as in Example 1 to obtain the three-point flexural strength at room temperature, Vickers hardness, and fracture toughness at room temperature. The test results are listed in Table 11.

Comparative Example 18

A powder mixture was prepared in the identical manner as in Example 31 except that W powder having a larger average particle size of 3.5 μm was utilized instead of the W particles of 0.35 μm average particle size. The powder mixture was processed in the identical manner as in Example 31 to obtain a disk-shaped sintered product of 50 mm diameter and 4 mm thick, which was found to be of fine structure having relative density of 99% or more and porosity of 1% or less, but was observed to have substantially all the W particles are present in the grain boundaries of partially stabilized zirconia by scan-type electron photomicrograph. Then, the disk-shaped sintered product were cut and grounded into corresponding test specimens measuring 4×3×35 mm and were subjected to the same tests as in Example 1 to obtain the three-point flexural strength at room temperature, Vickers hardness, and fracture toughness at room temperature. The test results are listed in Table 12 together with those of Example 31 for comparison. As apparent from Table 12, the sintered product of comparative Example 18 has three-point flexural strength less than that of Example 31.

Examples 37 to 42 and Comparative Examples 19 and 20

5% by volume of 99.9% or more pure molybdenum [Mo] powder having an average particle size of 0.65 μm was blended with a partially stabilized zirconia powder having an average particle size of 0.2 μm and containing $CeO_2$ in proportions from 0 to 35 mol %, as listed in Table 13, to prepare a powder mixture. The resulting power mixture was placed in a wet ball mill, composed of polyethylene-made vessel and polyethylene-coated iron balls, together with a solvent of acetone and was milled for 24 hours. The resulting fine powder was then molded in a high-pure alumina-made mold and sintered in an argon gas environment at a temperature of 1400° C. for 2 hours as being compressed at a pressure of 30

MPa to obtain a disk-shaped sintered product of 50 mm diameter and 4 mm thick.

The sintered products of Examples 37 to 42 and comparative Examples 19 and 20 were all found to have fine structure with relative density of 99% or more and with porosity of 1% or less, and were also observed by scan-type electron photomicrograph and transmission-type electron photomicrograph that Mo particles are certainly present within the grains of partially stabilized zirconia. By X-ray diffraction analysis for crystalline identification, the zirconia was found to have all the crystal structures of tetragonal system for Examples 37 to 41 containing 5 to 20 mol % of $CeO_2$, to have a mixed structure of tetragonal system partially mixed with cubic system for Example 42 containing 30 mol % of $CeO_2$, to have all the structure of cubic system for comparative Example 20 containing 35 mol % of $CeO_2$, and to have all the structure of orthorhombic system for comparative Example 19 containing no $CeO_2$. By chemical and X-ray diffraction quantitative analysis it was confirmed that the individual sintered products had the same component proportions as the initial blend proportions. Then, the disk-shaped sintered product were all cut and grounded into corresponding test specimens each measuring 4×3×35 mm, and were subjected to the same tests as in Example 1 to obtain the three-point flexural strength at room temperature, Vickers hardness, and fracture toughness at room temperature. The test results are listed in Table 13.

sis for crystalline identification, the zirconia was found to have all the crystal structures of tetragonal system for comparative Examples 21 to 25 containing 5 to 20 mol % of $CeO_2$, and to have a mixed structure of tetragonal system partially mixed with cubic system for comparative Example 26 containing 30 mol % of $CeO_2$. By chemical and X-ray diffraction quantitative analysis it was confirmed that the individual sintered products had the same component proportions as the initial blend proportions.

Then, the disk-shaped sintered product were cut and grounded into corresponding test specimens measuring 4×3×35 mm and were subjected to the same tests as in Example 1 to obtain the three-point flexural strength at room temperature, Vickers hardness, and fracture toughness at room temperature. The test results are listed in Table 14. As apparent from Tables 13 and 14, the sintered product of comparative Examples 21 to 26 incorporating the coarse Mo powder of an average particle size of 3.5 μm show three-point flexural strength less than that of Examples 37 to 42 incorporating the minute Mo powder of an average particle size of 0.65 μm.

Example 43

A 99.9% or more pure $\alpha$-$Al_2O_3$ powder having an average particle size of 0.2 μm was coated by the physical vapor deposition (PVD) technique with vanadium layer to prepare a composite powder containing 5% by

TABLE 13

|  | Incorporated amount of $CeO_2$ [mol %] | Average particle size of Mo Particles [μm] | Three-point flexural strength [MPa] | Fracture toughness [MPam$^{\frac{1}{2}}$] | Vickers Hardness [GPa] |
| --- | --- | --- | --- | --- | --- |
| Example 37 | 5.0 | 0.65 | 1080 | 14.8 | 10.0 |
| Example 38 | 8.0 | 0.65 | 1260 | 14.4 | 10.3 |
| Example 39 | 12.0 | 0.65 | 1380 | 12.6 | 10.8 |
| Example 40 | 16.0 | 0.65 | 1230 | 12.1 | 11.2 |
| Example 41 | 20.0 | 0.65 | 1030 | 11.7 | 11.3 |
| Example 42 | 30.0 | 0.65 | 980 | 9.6 | 11.5 |
| Comparative Example 19 | 0.0 | 0.65 | 200 | 1.5 | 9.5 |
| Comparative Example 20 | 35.0 | 0.65 | 300 | 2.0 | 11.8 |

TABLE 14

|  | Incorporated amount of $CeO_2$ [mol %] | Average particle size of Mo Particles [μm] | Three-point flexural strength [MPa] | Fracture toughness [MPam$^{\frac{1}{2}}$] | Vickers Hardness [GPa] |
| --- | --- | --- | --- | --- | --- |
| Comparative Example 21 | 5.0 | 3.5 | 645 | 15.8 | 9.4 |
| Comparative Example 22 | 8.0 | 3.5 | 755 | 15.4 | 9.6 |
| Comparative Example 23 | 12.0 | 3.5 | 830 | 13.3 | 10.1 |
| Comparative Example 24 | 16.0 | 3.5 | 737 | 12.7 | 10.5 |
| Comparative Example 25 | 20.0 | 3.5 | 615 | 12.3 | 10.6 |
| Comparative Example 26 | 30.0 | 3.5 | 585 | 10.1 | 10.8 |

Comparative Examples 21 to 26

A powder mixture was prepared in the identical manner as in Example 37 except that Mo powder having a larger average particle size of 3.5 μm was utilized instead of the Mo particles of 0.65 μm average particle size with the partially stabilized zirconia containing $CeO_2$ in proportions, as listed in Table 14. The powder mixture was processed in the identical manner as in Example 37 to obtain a disk-shaped sintered product of 50 mm diameter and 4 mm thick, which was found to be of fine structure having relative density of 99% or more and porosity of 1% or less, but was observed to have substantially all the Mo particles are present in the grain boundaries of partially stabilized zirconia by scan-type electron photomicrograph. By X-ray diffraction analyvolume, based upon the total volume, of vanadium [V]. The resulting composite powder was placed in a wet ball mill, composed of alumina-made vessel and alumina-made balls, together with a solvent of acetone and was milled for 48 hours. The resulting fine powder was then molded in a graphite-made mold and sintered in a hydrogen reducing environment up to a temperature of 1000° C. followed by being sintered in a vacuum of $10^{-4}$ Torr at a temperature of 1450° C. for 1 hour as being compressed at a pressure of 30 MPa to obtain a disk-shaped sintered product of 50 mm diameter and 4 mm thick. The sintered product was found to have fine structure with relative density of 99% or more and with porosity of 1% or less, and was also observed by scan-type electron photomicrograph and transmission-type electron photomicrograph that about 70% or more of plate-like and granular V phase are present within the grains of α-Al$_2$O$_3$. By chemical and X-ray diffraction quantitative analysis it was confirmed that the sintered product had the same component proportions as the initial blend proportions.

Then, the disk-shaped sintered products were cut and grounded into corresponding test specimens each measuring 4×3×35 mm, and were subjected to the same tests as in Example 1 to obtain the three-point flexural strength at room temperature, Vickers hardness, and fracture toughness at room temperature. The test results are listed in Table 15.

Example 44

A 99.9% or more pure α-Al$_2$O$_3$ powder having an average particle size of 0.2 μm was blended with polyvinylalcohol to prepare a powder mixture containing 3% by weight of polyvinylalcohol. The resulting powder was pelletized by the spray-and-dry technique to provide a pelletized powder which was then coated by the physical vapor deposition (PVD) technique with niobium layer to prepare a composite pelletized powder containing 5% by volume, based upon the total volume, of niobium [Nb]. The resulting composite pelletized powder was placed in a wet ball mill, composed of alumina-made vessel and alumina-made balls, together with a solvent of acetone and was milled for 48 hours. The resulting fine powder was then molded in a graphite-made mold and sintered in a hydrogen reducing environment up to a temperature of 1000° C. followed by being sintered in a vacuum of 10$^{-4}$ Torr at a temperature of 1450° C. for 1 hour as being compressed at a pressure of 30 MPa to obtain a disk-shaped sintered product of 50 mm diameter and 4 mm thick. The sintered product was found to have fine structure with relative density of 99% or more and with porosity of 1% or less, and was also observed by scan-type electron photomicrograph and transmission-type electron photomicrograph that about 70% or more of plate-like and granular Nb phase are present within the grains of α-Al$_2$O$_3$. By chemical and X-ray diffraction quantitative analysis it was confirmed that the sintered product had the same component proportions as the initial blend proportions.

Then, the disk-shaped sintered products were cut and grounded into corresponding test specimens each measuring 4×3×35 mm, and were subjected to the same tests as in Example 1 to obtain the three-point flexural strength at room temperature, Vickers hardness, and fracture toughness at room temperature. The test results are listed in Table 15.

Example 45

A 99.9% or more pure γ-Al$_2$O$_3$ powder having a BET specific surface area of 200 m$^2$ g was blended with a 99.9% or more pure WO$_3$ powder having an average particle size of 0.35 μm in such proportions as to prepare a powder mixture which, after sintering, produces α-Al$_2$O$_3$ and W in a volume ratio of 95 to 5. The powder mixture was placed in a wet ball mill, composed of alumina-made vessel and alumina-made balls, together with a solvent of acetone and was milled for 24 hours. The resulting fine powder was heated preliminary in an atmospheric environment at a temperature of 900° C. for 8 hours to obtain a preliminary product composed of Al$_2$O$_3$ and a composite oxide AlWO$_4$. Thus obtained preliminary product was milled in a dry ball mill in an argon gas environment to provide a fine composite powder which was then molded in a graphite-made mold and sintered in a hydrogen gas reducing environment up to a temperature of 1000° C. followed by being sintered in an argon gas environment containing 10% by volume of hydrogen at a temperature of 1400° C. for 1 hour as being compressed at a pressure of 30 MPa to obtain a disk-shaped sintered product of 50 mm diameter and 4 mm thick. The sintered product was found to have fine structure with relative density of 99% or more and with porosity of 1% or less, and was also observed by scan-type electron photomicrograph and transmission-type electron photomicrograph that about 80% or more of W phase were present within the grains of α-Al$_2$O$_3$. By chemical and X-ray diffraction quantitative analysis it was confirmed that the sintered product had the same component proportions as the initial blend proportions.

Then, the disk-shaped sintered products were cut and grounded into corresponding test specimens each measuring 4×3×35 mm, and were subjected to the same tests as in Example 1 to obtain the three-point flexural strength at room temperature, Vickers hardness, and fracture toughness at room temperature. The test results are listed in Table 16.

Example 46

A 99.9% or more pure α-Al$_2$O$_3$ powder having an average particle size of 0.2 μm was blended with a 99.9% or more pure MoO$_3$ powder having an average particle size of 0.65 μm in such proportions as to prepare a powder mixture which, after sintering, produces α-Al$_2$O$_3$ and Mo in a volume ratio of 95 to 5. The powder mixture was placed in a wet ball mill, composed of alumina-made vessel and alumina-made balls, together with a solvent of acetone and was milled for 24 hours. The resulting fine powder was heated preliminary in an atmospheric environment at a temperature of 900° C. for 8 hours to obtain a preliminary product composed of Al$_2$O$_3$ and a composite oxide Al$_2$(MoO$_4$)$_3$. Thus obtained preliminary product was milled in a dry ball mill in an argon gas environment to provide a fine composite powder which was then molded in a graphite-made mold and sintered in a hydrogen gas reducing environment up to a temperature of 1000° C. followed by being sintered in a vacuum of 10$^{-4}$ Torr at a temperature of 1500° C. for 1 hour as being compressed at a pressure of 30 MPa to obtain a disk-shaped sintered product of 50 mm diameter and 4 mm thick. The sintered product was found to have fine structure with relative density of 99% or more and with porosity of 1% or less, and was

TABLE 15

|  | Incorporated amount of Metal [vol %] | Metal Incorporated | Three-point flexural strength [MPa] | Fracture toughness [MPam$^{\frac{1}{2}}$] | Vickers Hardness [GPa] |
| --- | --- | --- | --- | --- | --- |
| Example 43 | 5 | V | 1185 | 7.6 | 17.8 |
| Example 44 | 5 | Nb | 1200 | 7.5 | 18.0 | also observed by scan-type electron photomicrograph and transmission-type electron photomicrograph that about 80% or more of Mo phase were present within the grains of α-Al$_2$O$_3$. By chemical and X-ray diffraction quantitative analysis it was confirmed that the sintered product had the same component proportions as the initial blend proportions. Then, the disk-shaped sintered products were cut and grounded into corresponding test specimens each measuring 4×3×35 mm, and were subjected to the same tests as in Example 1 to obtain the three-point flexural strength at room temperature, Vickers hardness, and fracture toughness at room temperature. The test results are listed in Table 16.

TABLE 16

|  | Three-point flexural strength [MPa] | Fracture toughness [MPam$^{\frac{1}{2}}$] | Vickers Hardness [GPa] |
| --- | --- | --- | --- |
| Example 45 | 1350 | 7.1 | 18.5 |
| Example 46 | 1380 | 8.2 | 18.0 |

Example 47

A 99.9% or more pure α-Al$_2$O$_3$ powder having an average particle size of 0.2 μm was blended with a 99.9% or more pure WO$_3$ powder having an average particle size of 0.35 μm in such proportion as to prepare a powder mixture which, after sintering produces α-Al$_2$O$_3$ and W in volume ratio of 95 to 5. The powder mixture was placed in a wet ball mill, composed of alumina-made vessel and alumina-made balls, together with a solvent of acetone and was milled for 48 hours. The resulting fine powder was molded in a graphite-made mold and sintered in a hydrogen gas reducing environment up to a temperature of 1000° C. followed by being sintered in a vacuum of 10$^{-4}$ Torr at a temperature of 1400° C. for 1 hour as being compressed at a pressure of 30 MPa to obtain a disk-shaped sintered product of 50 mm diameter and 4 mm thick. The sintered product was found to have fine structure with relative density of 99% or more and with porosity of 1% or less, and was also observed by scan-type electron photomicrograph and transmission-type electron photomicrograph that about 80% or more of W phase were present within the grains of α-Al$_2$O$_3$. By chemical and X-ray diffraction quantitative analysis it was confirmed that the sintered product had the same component proportions as the initial blend proportions.

Then, the disk-shaped sintered products were cut and grounded into corresponding test specimens each measuring 4×3×35 mm, and were subjected to the same tests as in Example 1 to obtain the three-point flexural strength at room temperature, Vickers hardness, and fracture toughness at room temperature. The test results are listed in Table 17.

Example 48

A 99.9% or more pure α-Al$_2$O$_3$ powder having an average particle size of 0.2 μm was blended with a 99.9% or more pure MoO$_3$ powder having an average particle size of 0.65 μm in such proportions as to prepare a powder mixture which, after sintering produces Al$_2$O$_3$ and Mo in a volume ratio of 95 to 5. The powder mixture was placed in a wet ball mill, composed of alumina-made vessel and alumina-made balls, together with a solvent of acetone and was milled for 48 hours. The resulting fine powder was molded in a graphite-made mold and sintered in a hydrogen gas reducing environment up to a temperature of 1000° C. followed by being sintered in a vacuum of 10$^{-4}$ Torr at a temperature of 1500° C. for 1 hour as being compressed at a pressure of 30 MPa to obtain a disk-shaped sintered product of 50 mm diameter and 4 mm thick.

The sintered product was found to have fine structure with relative density of 99% or more and with porosity of 1% or less, and was also observed by scan-type electron photomicrograph and transmission-type electron photomicrograph that about 70% or more of Mo phase were present within the grains of α-Al$_2$O$_3$. By chemical and X-ray diffraction quantitative analysis it was confirmed that the sintered product had the same component proportions as the initial blend proportions.

Then, the disk-shaped sintered products were cut and grounded into corresponding test specimens each measuring 4×3×35 mm, and were subjected to the same tests as in Example 1 to obtain the three-point flexural strength at room temperature, Vickers hardness, and fracture toughness at room temperature. The test results are listed in Table 17.

Example 49

A 99.9% or more pure α-Al$_2$O$_3$ powder having an average particle size of 0.2 μm was blended with a 99.9% or more pure Nb$_2$O$_5$ powder having an average particle size of 0.5 μm in such proportions as to prepare a powder mixture which, after sintering, produces α-Al$_2$O$_3$ and Nb in a volume ratio of 95 to 5. The powder mixture was placed in a wet ball mill, composed of alumina-made vessel and alumina-made balls, together with a solvent of acetone and was milled for 48 hours. The resulting fine powder was molded in a graphite-made mold and sintered in a hydrogen gas reducing environment up to a temperature of 1000° C. followed by being sintered in a vacuum of 10$^{-4}$ Torr at a temperature of 1450° C. for 1 hour as being compressed at a pressure of 30 MPa to obtain a disk-shaped sintered product of 50 mm diameter and 4 mm thick.

The sintered product was found to have fine structure with relative density of 99% or more and with porosity of 1% or less, and was also observed by scan-type electron photomicrograph and transmission-type electron photomicrograph that about 70% or more of Nb phase were present within the grains of α-Al$_2$O$_3$. By chemical and X-ray diffraction quantitative analysis it was confirmed that the sintered product had the same component proportions as the initial blend proportions.

Then, the disk-shaped sintered products were cut and grounded into corresponding test specimens each measuring 4×3×35 mm, and were subjected to the same tests as in Example 1 to obtain the three-point flexural strength at room temperature, Vickers hardness, and fracture toughness at room temperature. The test results are listed in Table 17.

Example 50

A 99.9% or more pure mullite [3Al$_2$O$_3$.2SiO$_2$] powder having an average particle size of 0.2 μm was blended with a 99.9% or more pure WO$_3$ powder having an average particle size of 0.35 μm in such proportions as to prepare a powder mixture which, after sintering, produces 3Al$_2$O$_3$.2SiO$_2$ and W in a volume ratio of 95 to 5. The powder mixture was placed in a wet ball mill, composed of alumina-made vessel and alumina-made balls, together with a solvent of acetone and was milled for 48 hours. The resulting fine powder was molded in a graphite-made mold and sintered in a hydrogen gas reducing environment up to a temperature of 1000° C. followed by being sintered in an argon gas environment at a temperature of 1600° C. for 1 hour as being compressed at a pressure of 30 MPa to obtain a disk-shaped sintered product of 50 mm diameter and 4 mm thick.

The sintered product was found to have fine structure with relative density of 99% or more and with porosity of 1% or less, and was also observed by scan-type electron photomicrograph and transmission-type electron photomicrograph that about 80% or more of W phase were present within the grains of mullite. By chemical and X-ray diffraction quantitative analysis it was confirmed that the sintered product had the same component proportions as the initial blend proportions.

Then, the disk-shaped sintered products were cut and grounded into corresponding test specimens each measuring 4×3×35 mm, and were subjected to the same tests as in Example 1 to obtain the three-point flexural strength at room temperature, Vickers hardness, and fracture toughness at room temperature. The test results are listed in Table 17.

Example 51

A 99.9% or more pure α-$Si_3N_4$ powder having an average particle size of 0.2 μm was intermingled with 5% by weight of $Al_2O_3$ and 5% by weight of $Y_2O_5$ to prepare a mixture containing $Al_2O_3$ and $Y_2O_5$ as sintering promoting agents. The mixture was blended with a 99.9% or more pure $V_2O_5$ powder having an average particle size of 0.4 μm in such proportions as to prepare powder mixture which, after sintering, produces β-$Si_3N_4$ and V in a volume ratio of 95 to 5. The powder mixture was placed in a wet ball mill, composed of alumina-made vessel and alumina-made balls, together with a solvent of acetone and was milled for 48 hours. The resulting fine powder was molded in a graphite-made mold and sintered in a hydrogen gas reducing environment up to a temperature of 1000° C. followed by being sintered in an argon gas environment at a temperature of 1800° C. for 3 hours as being compressed at a pressure of 30 MPa to obtain a disk-shaped sintered product of 50 mm diameter and 4 mm thick.

The sintered product was found to have fine structure with relative density of 99% or more and with porosity of 1% or less, and was also observed by scan-type electron photomicrograph and transmission-type electron photomicrograph that about 70% or more of V phase were present within the grains of β-$Si_3N_4$. By chemical and X-ray diffraction quantitative analysis it was confirmed that the sintered product had the same component proportions as the initial blend proportions.

Then, the disk-shaped sintered products were cut and grounded into corresponding test specimens each measuring 4×3×35 mm, and were subjected to the same tests as in Example 1 to obtain the three-point flexural strength at room temperature, Vickers hardness, and fracture toughness at room temperature. The test results are listed in Table 17.

Example 52

A 99.9% or more pure MgO powder having an average particle size of 0.1 μm was blended with a $TiH_2$ powder having an average particle size of 30 μm in such proportions as to prepare a powder mixture which, after sintering, produces MgO and T in a volume ratio of 95 to 5. The powder mixture was placed in a wet ball mill, composed of polyethylene-made vessel and polyethylene coated iron balls, together with a solvent of acetone and was milled for 72 hours to such an extent that $TiH_2$ powder was milled into an average particle size of about 0.2 μm. The resulting fine powder was molded in a graphite-made mold and sintered in a hydrogen gas reducing environment up to a temperature of 1000° C. followed by being sintered in an argon gas environment at a temperature of 1450° C. for 1 hour as being compressed at a pressure of 30 MPa to obtain a disk-shaped sintered product of 50 mm diameter and 4 mm thick.

The sintered product was found to have fine structure with relative density of 99% or more and with porosity of 1% or less, and was also observed by scan-type electron photomicrograph and transmission-type electron photomicrograph that about 80% or more of Ti phase were present within the grains of MgO. By chemical and X-ray diffraction quantitative analysis it was confirmed that the sintered product had the same component proportions as the initial blend proportions.

Then, the disk-shaped sintered products were cut and grounded into corresponding test specimens each measuring 4×3×35 mm, and were subjected to the same tests as in Example 1 to obtain the three-point flexural strength at room temperature, Vickers hardness, and fracture toughness at room temperature. The test results are listed in Table 17.

Example 53

A 99.9% or more pure α-$Al_2O_3$ powder having an average particle size of 0.2 μm was blended with a $WO_3$ powder having an average particle size of 0.35 μm in such proportions as to prepare a powder mixture which, after sintering, produces α-$Al_2O_3$ and W in a volume ratio of 95 to 5. The powder mixture was placed in a planetary ball mill, composed of a pot and balls both made of partially stabilized zirconia, and was milled in a dry condition for 24 hours. The resulting fine powder was molded in a graphite-made mold and sintered in a hydrogen gas reducing environment up to a temperature of 1000° C. followed by being sintered in a vacuum of $10^{-4}$ Torr at a temperature of 1400° C. for 1 hour as being compressed at a pressure of 30 MPa to obtain a disk-shaped sintered product of 50 mm diameter and 4 mm thick.

The sintered product was found to have fine structure with relative density of 99% or more and with porosity of 1% or less, and was also observed by scan-type electron photomicrograph and transmission-type electron photomicrograph that about 90% or more of W phase were present within the grains of α-$Al_2O_3$. By chemical and X-ray diffraction quantitative analysis it was confirmed that the sintered product had the same component proportions as the initial blend proportions.

Then, the disk-shaped sintered products were cut and grounded into corresponding test specimens each measuring 4×3×35 mm, and were subjected to the same tests as in Example 1 to obtain the three-point flexural strength at room temperature, Vickers hardness, and fracture toughness at room temperature. The test results are listed in Table 17.

Example 54

A 99.9% or more pure α-$Al_2O_3$ powder having an average particle size of 0.2 μm was blended with a $MoO_3$ powder having an average particle size of 0.65 μm in such proportions as to prepare a powder mixture which, after sintering, produces α-$Al_2o3$ and Mo in a volume ratio of 95 to 5. The powder mixture was placed in a high energy ball mill known as the Attoritor, composed of a pot and balls both made of partially stabilized zirconia, and was milled in a dry condition for 24 hours. The resulting fine powder was molded in a graphite-made mold and sintered in a hydrogen gas reducing environment up to a temperature of 1000° C. followed by being sintered in a vacuum of $10^{-4}$ Torr at a temperature of 1500° C. for 1 hour as being compressed at a pressure of 30 MPa to obtain a disk-shaped sintered product of 50 mm diameter and 4 mm thick.

The sintered product was found to have fine structure with relative density of 99% or more and with porosity of 1% or less, and was also observed by scan-type electron photomicrograph and transmission-type electron photomicrograph that about 90% or more of Mo phase were present within the grains of $\alpha$-$Al_2O_3$. By chemical and X-ray diffraction quantitative analysis it was confirmed that the sintered product had the same components proportions as the initial blend proportions.

Then, the disk-shaped sintered products were cut and grounded into corresponding test specimens each measuring 4×3×35 mm, and were subjected to the same tests as in Example 1 to obtain the three-point flexural strength at room temperature, Vickers hardness, and fracture toughness at room temperature. The test results are listed in Table 17.

Example 55

A 99.9% or more pure $\alpha$-$Al_2O_3$ powder having an average particle size of 0.2 μm was blended with a $Nb_2O_5$ powder having an average particle size of 0.5 μm in such proportions as to prepare a powder mixture which, after sintering, produces $\alpha$-$Al_2O_3$ and Nb in a volume ratio of 95 to 5. The powder mixture was placed in a ball mill, composed of a pot and balls both made of partially stabilized zirconia, and was milled in a dry condition for 480 hours. The resulting fine powder was molded in a graphite-made mold and sintered in a hydrogen gas reducing environment up to a temperature of 1000° C. followed by being sintered in a vacuum of $10^{-4}$ Torr at a temperature of 1450° C. for 1 hour as being compressed at a pressure of 30 MPa to obtain a disk-shaped sintered product of 50 mm diameter and 4 mm thick.

The sintered product was found to have fine structure with relative density of 99% or more and with porosity of 1% or less, and was also observed by scan-type electron photomicrograph and transmission-type electron photomicrograph that about 90% or more of Nb phase were present within the grains of $\alpha$-$Al_2O_3$. By chemical and X-ray diffraction quantitative analysis it was confirmed that the sintered product had the same component proportions as the initial blend proportions.

Then, the disk-shaped sintered products were cut and grounded into corresponding test specimens each measuring 4×3×35 mm, and were subjected to the same tests as in Example 1 to obtain the three-point flexural strength at room temperature, Vickers hardness, and fracture toughness at room temperature. The test results are listed in Table 17.

TABLE 17

|  | Three-point flexural strength [MPa] | Fracture toughness [MPam$^{\frac{1}{2}}$] | Vickers Hardness [GPa] |
|---|---|---|---|
| Example 47 | 1300 | 7.9 | 18.5 |
| Example 48 | 1355 | 8.6 | 18.0 |
| Example 49 | 1330 | 8.3 | 18.5 |
| Example 50 | 880 | 5.3 | 11.5 |

TABLE 17-continued

|  | Three-point flexural strength [MPa] | Fracture toughness [MPam$^{\frac{1}{2}}$] | Vickers Hardness [GPa] |
|---|---|---|---|
| Example 51 | 1380 | 8.3 | 14.5 |
| Example 52 | 1000 | 6.8 | 7.5 |
| Example 53 | 1330 | 7.7 | 18.5 |
| Example 54 | 1375 | 8.3 | 18.0 |
| Example 55 | 1350 | 8.2 | 18.5 |

Example 56

A 99.9% or more pure $\alpha$-$Al_2O_3$ powder having an average particle size of 0.2 μm was dispersed in an ethanol solution containing tri-ethoxy-vanadyl [VO($OC_2H_5$)] to provide a mixture which, after sintering, produces $\alpha$-$Al_2O_3$ and V in a volume ratio of 95 to 5. The mixture was hydrolyzed by addition of water and was then dried followed by being heated in an atmospheric environment at a temperature of 800° C. for 4 hours to obtain a powder mixture of $Al_2O_3$ and $V_2O_5$. The resulting powder mixture was molded in a graphite-made mold and sintered in a hydrogen gas reducing environment up to a temperature of 1000° C. followed by being sintered in an argon gas environment including 10% by volume of hydrogen at a temperature of 1500° C. for 1 hour as being compressed at a pressure of 30 MPa to obtain a disk-shaped sintered product of 50 mm diameter and 4 mm thick.

The sintered product was found to have fine structure with relative density of 99% or more and with porosity of 1% or less, and was also observed by scan-type electron photomicrograph and transmission-type electron photomicrograph that about 90% or more of V phase were present within the grains of $\alpha$-$Al_2O_3$. By chemical and X-ray diffraction quantitative analysis it was confirmed that the sintered product had the same component proportions as the initial blend proportions.

Then, the disk-shaped sintered products were cut and grounded into corresponding test specimens each measuring 4×3×35 mm, and were subjected to the same tests as in Example 1 to obtain the three-point flexural strength at room temperature, Vickers hardness, and fracture toughness at room temperature. The test results are listed in Table 18.

Example 57

A 99.9% or more pure MgO powder having an average particle size of 0.1 μm was dispersed in an ethanol solution containing tetra-ethoxy-titan [Ti($OC_2H_5$)$_4$] to provide a mixture which, after sintering, produces MgO and Ti in a volume ratio of 95 to 5. The mixture was hydrolyzed by addition of water and was then dried followed by being heated in an atmospheric environment at a temperature of 800° C. for 4 hours to obtain a powder mixture of MgO and $TiO_2$. The resulting powder mixture was molded in a graphite-made mold and sintered in a hydrogen gas reducing environment up to a temperature of 1000° C. followed by being sintered in an argon gas environment including 10% by volume of hydrogen at a temperature of 1450° C. for 1 hour as being compressed at a pressure of 30 MPa to obtain a disk-shaped sintered product of 50 mm diameter and 4 mm thick.

The sintered product was found to have fine structure with relative density of 99% or more and with porosity of 1% or less, and was also observed by scan-type electron photomicrograph and transmission-type electron photomicrograph that about 90% or more of Ti phase were present within the grains of MgO. By chemical and X-ray diffraction quantitative analysis it was confirmed that the sintered product had the same component proportions as the initial blend proportions.

Then, the disk-shaped sintered products were cut and grounded into corresponding test specimens each measuring 4×3×35 mm, and were subjected to the same tests as in Example 1 to obtain the three-point flexural strength at room temperature, Vickers hardness, and fracture toughness at room temperature. The test results are listed in Table 18.

Example 58

A 98% or more pure α-$Si_3N_4$ powder having an average particle size of 0.2 μm was dispersed in an ethanol solution containing penta-ethoxy-tungsten [$W(OC_2H_5)_5$] together with 5% by weight of $Al_2O_3$ and 5% by weight of $Y_2O_3$, to provide a mixture which, after sintering, produces β-$Si_3N_4$ and W in a volume ratio of 95 to 5 and additionally containing $Al_2O_3$ and $Y_2O_3$ as sintering promoting agents. The mixture was hydrolyzed by addition of water and was then dried followed by being heated in an atmospheric environment at a temperature of 800° C. for 4 hours to obtain a powder mixture of α-$Si_3N_4$ and $WO_3$. The resulting powder mixture was molded in a graphite-made mold and sintered in a hydrogen gas reducing environment up to a temperature of 1000° C. followed by being sintered in an argon gas environment including 10% by volume of hydrogen at a temperature of 1800° C. for 3 hours as being compressed at a pressure of 30 MPa to obtain a disk-shaped sintered product of 50 mm diameter and 4 mm thick.

The sintered product was found to have fine structure with relative density of 99% or more and with porosity of 1% or less, and was also observed by scan-type electron photomicrograph and transmission-type electron photomicrograph that about 90% or more of W phase were present within the grains of β-$Si_3N_4$. By chemical and X-ray diffraction quantitative analysis it was confirmed that the sintered product had the same component proportions as the initial blend proportions.

Then, the disk-shaped sintered products were cut and grounded into corresponding test specimens each measuring 4×3×35 mm, and were subjected to the same tests as in Example 1 to obtain the three-point flexural strength at room temperature, Vickers hardness, and fracture toughness at room temperature. The test results are listed in Table 18.

Example 59

A 99.9% or more pure mullite [$3Al_2O_3.2SiO_2$] powder having an average particle size of 0.2 μm was dispersed in an ethanol solution containing penta-ethoxy-tungsten [$W(OC_2H_5)_5$] to provide a mixture which, after sintering, produces $3Al_2O_3.2SiO_2$ and W in a volume ratio of 95 to 5. The mixture was hydrolyzed by addition of water and was then dried followed by being heated in an atmospheric environment at a temperature of 800° C. for 4 hours to obtain a powder mixture of $3Al_2O_3.2SiO_2$ and $WO_3$. The resulting powder mixture was molded in a graphite-made mold and sintered in a hydrogen gas reducing environment up to a temperature of 1000° C. followed by being sintered in an argon gas environment including 10% by volume of hydrogen at a temperature of 1600° C. for 1 hour as being compressed at a pressure of 30 MPa to obtain a disk-shaped sintered product of 50 mm diameter and 4 mm thick.

The sintered product was found to have fine structure with relative density of 99% or more and with porosity of 1% or less, and was also observed by scan-type electron photomicrograph and transmission-type electron photomicrograph that about 90% or more of W phase were present within the grains of $3Al_2O_3.2SiO_2$. By chemical and X-ray diffraction quantitative analysis it was confirmed that the sintered product had the same component proportions as the initial blend proportions.

Then, the disk-shaped sintered products were cut and grounded into corresponding test specimens each measuring 4×3×35 mm, and were subjected to the same tests as in Example 1 to obtain the three-point flexural strength at room temperature, Vickers hardness, and fracture toughness at room temperature. The test results are listed in Table 18.

Example 60

Tri-i-propoxyl-aluminum [$Al(O-i-C_3H_7)_3$] and penta-ethoxy-Niobium [$Nb(OC_2H_5)_5$] were dissolved in ethanol in such proportions as to provide, after sintering, $Al_2O_3$ and Nb in a volume ratio of 95 to 5. Thus prepared ethanol solution was hydrolyzed by addition of water and was then dried followed by being heated in an atmospheric environment at a temperature of 800° C. for 4 hours to obtain a powder mixture of $Al_2O_3$ and $Nb_2O_5$. The resulting powder mixture was molded in a graphite-made mold and sintered in a hydrogen gas reducing environment up to a temperature of 1000° C. followed by being sintered in an argon gas environment including 10% by volume of hydrogen at a temperature of 1450° C. for 1 hour as being compressed at a pressure of 30 MPa to obtain a disk-shaped sintered product of 50 mm diameter and 4 mm thick.

The sintered product was found to have fine structure with relative density of 99% or more and with porosity of 1% or less, and was also observed by scan-type electron photomicrograph and transmission-type electron photomicrograph that about 90% or more of Nb phase were present within the grains of α-$Al_2O_3$. By chemical and X-ray diffraction quantitative analysis it was confirmed that the sintered product had the same component proportions as the initial blend proportions.

Then, the disk-shaped sintered products were cut and grounded into corresponding test specimens each measuring 4×3×35 mm, and were subjected to the same tests as in Example 1 to obtain the three-point flexural strength at room temperature, Vickers hardness, and fracture toughness at room temperature. The test results are listed in Table 18.

Example 61

Tri-i-propoxyl-aluminum [$Al(O-i-C_3H_7)_3$] and penta-ethoxy-Molybdenum [$Mo(OC_2H_5)_5$] were dissolved in ethanol in such proportions as to produce, after sintering, $Al_2O_3$ and Mo in a volume ratio of 95 to 5. Thus prepared ethanol solution was kept at a temperature of 100° C. for 8 hours and was hydrolyzed by addition of water. Then, it was dried followed by being heated in an atmospheric environment at a temperature of 800° C. for 4 hours to obtain a powder mixture of $Al_2O_3$ and $MoO_3$. The resulting powder mixture was molded in a graphite-made mold and sintered in a hydrogen gas reducing environment up to a temperature of 1000° C. followed by being sintered in an argon gas environment including 10% by volume of hydrogen at a temperature of 1450° C. for 1 hour as being compressed at a pressure of 30 MPa to obtain a disk-shaped sintered product of 50 mm diameter and 4 mm thick.

The sintered product was found to have fine structure with relative density of 99% or more and with porosity of 1% or less, and was also observed by scan-type electron photomicrograph and transmission-type electron photomicrograph that about 90% or more of Mo phase were present within the grains of $\alpha$-$Al_2O_3$. By chemical and X-ray diffraction quantitative analysis it was confirmed that the sintered product had the same component proportions as the initial blend proportions.

Then, the disk-shaped sintered products were cut and grounded into corresponding test specimens each measuring 4×3×35 mm, and were subjected to the same tests as in Example 1 to obtain the three-point flexural strength at room temperature, Vickers hardness, and fracture toughness at room temperature. The test results are listed in Table 18.

TABLE 18

|  | Three-point flexural strength [MPa] | Fracture toughness [MPam$^{\frac{1}{2}}$] | Vickers Hardness [GPa] |
| --- | --- | --- | --- |
| Example 56 | 1370 | 7.4 | 18.0 |
| Example 57 | 1190 | 6.6 | 7.7 |
| Example 58 | 1400 | 8.1 | 14.6 |
| Example 59 | 905 | 5.0 | 11.5 |
| Example 60 | 1380 | 8.0 | 18.5 |
| Example 61 | 1390 | 8.1 | 18.0 |

What is claimed is:

1. A method of fabricating a sintered ceramic-metal composite product comprising:

a ceramic matrix of polycrystalline ceramic; and
a metal phase having a higher melting point than a sintering temperature of said ceramic matrix, said metal phase comprising a number of metal particles dispersed within the grains of the polycrystalline ceramic and having an average particle size of 1 μm or less;

said method comprising the steps of:
preparing a powder mixture of a ceramic powder having an average particle size of 0.5 μm or less and 0.5 to 50% by volume of at least one metal element selected from groups IVa, Va and VIa of the periodic table, said metal element being in the form of a powder having an average particle size of 1 μm or less; and sintering said powder mixture to obtain said ceramic-metal composite product.

2. A method as set forth in claim 1, wherein said powder mixture is prepared as a fine composite powder through the steps of coating said ceramic powder with at least one said metal element and milling a resulting coated powder into a fine particle size.

3. A method as set forth in claims 1, wherein said powder mixture is prepared as a fine composite powder through the steps of providing granules of aggregated ceramic powder, coating said granules with at least one said metal element, and milling resulting coated granules into a fine particle size.

4. The method as set forth in claim 1, wherein said ceramic matrix is selected from the group consisting of alumina, MgO, a partially stabilized zirconia containing 5 to 30 mol % of $CeO_2$ as a stabilizing agent, mullite, and $Si_3N_4$.

5. A method of fabricating a sintered ceramic-metal composite product which comprises:

a ceramic matrix of polycrystalline ceramic; and
a metal phase having a higher melting point than a sintering temperature of said ceramic matrix, said metal phase comprising a number of metal particles dispersed within the grains of the polycrystalline ceramic and having an average particle size of 1 μm or less;

said method comprising the steps of:
preparing a powder mixture of a ceramic powder having an average particle size of 0.5 μm or less and a metal oxide of at least one metal element selected from groups IVa, Va and VIa of the periodic table;
heating said powder mixture preliminary in an atmospheric environment to provide a preliminary heated product; and
sintering said preliminary product in a reducing environment to obtain said ceramic-metal composite product.

6. A method of fabricating a sintered ceramic-metal composite product which comprises:

a ceramic matrix of polycrystalline ceramic; and
a metal phase having a higher melting point than a sintering temperature of said ceramic matrix, said metal phase comprising a number of metal particles dispersed within the grains of the polycrystalline ceramic and having an average particle size of 1 μm or less;

said method comprising the steps of:
preparing a powder mixture of a ceramic powder having an average particle size of 0.5 μm or less and a metal hydride of at least one metal element selected from groups IVa, Va and VIa of the periodic table; and
sintering said preliminary product in a reducing environment to obtain said ceramic-metal composite product.

7. A method of fabricating a sintered ceramic-metal composite product which comprises:

a ceramic matrix of polycrystalline ceramic; and
a metal phase having a higher melting point than a sintering temperature of said ceramic matrix, said metal phase comprising a number of metal particles dispersed within the grains of the polycrystalline ceramic and having an average particle size of 1 μm or less;

said method comprising the steps of:
preparing a powder mixture of a ceramic powder having an average particle size of 0.5 μm or less and a metal oxide of at least one metal element selected from groups IVa, Va and VIa of the periodic table;
milling said powder mixture under a dry condition into a fine powder mixture; and
sintering said powder mixture in a reducing environment to obtain said ceramic-metal composite product.

8. A method as set forth in claim 7, wherein said powder mixture is obtained by:
preparing a mixture of said ceramic powder having an average particle size of 0.5 μm or less, a metal alkoxide of at least one metal element selected from groups IVa, Va and VIa of the periodic table, and an alcohol; and
hydrolyzing and heating said mixture.

9. A method as set forth in claim 7 wherein said powder mixture is obtained by:

dissolving a metal alkoxide of at least one metal element selected from groups IVa, Va and VIa of the periodic table together with an alkoxide of a ceramic constituting element into an alcohol to obtain an alcohol solution thereof;

hydrolyzing and heating said alcohol solution.

10. A method as set forth in claim 9, wherein said powder mixture is obtained by:

heating said alcohol solution to form a composite alkoxide; and hydrolyzing and heating said composite alkoxide.

11. A method of fabricating a sintered ceramic-metal composite product which comprises:

a ceramic matrix of polycrystalline ceramic; and a metal phase having a higher melting point than a sintering temperature of said ceramic matrix, said metal phase comprising a number of metal particles dispersed within the grains of the polycrystalline ceramic and having an average particle size of 1 $\mu$m or less;

said method comprising the steps of:

preparing a powder mixture of a ceramic powder having an average particle size of 0.5 $\mu$m or less and a metal oxide of at least one metal element selected from groups IVa, Va and VIa of the periodic table;

milling said powder mixture under a wet condition into a fine powder mixture; and sintering said powder mixture in a reducing environment to obtain said ceramic-metal composite product.

12. A method as set forth in claim 11, wherein said powder mixture is obtained by:

preparing a mixture of said ceramic powder having an average particle size of 0.5 $\mu$m or less, a metal alkoxide of at least one metal element selected from groups IVa, Va and VIa of the periodic table, and an alcohol; and hydrolyzing and heating said mixture.

13. A method as set forth in claim 11 wherein said powder mixture is obtained by:

dissolving a metal alkoxide of at least one metal element selected from groups IVa, Va and VIa of the periodic table together with an alkoxide of a ceramic constituting element into an alcohol to obtain an alcohol solution thereof;

hydrolyzing and heating said alcohol solution.

14. A method as set forth in claim 13, wherein said powder mixture is obtained by:

heating said alcohol solution to form a composite alkoxide; and hydrolyzing and heating said composite alkoxide.

* * * * *